United States Patent
Early et al.

(10) Patent No.: US 8,871,089 B2
(45) Date of Patent: Oct. 28, 2014

(54) WASTEWATER TREATMENT SYSTEM

(76) Inventors: Daniel M. Early, New Castle, VA (US);
Scott F. Easter, Huddleston, VA (US)

( * ) Notice: Subject to any disclaimer, the term of this patent is extended or adjusted under 35 U.S.C. 154(b) by 481 days.

(21) Appl. No.: 13/342,916

(22) Filed: Jan. 3, 2012

(65) Prior Publication Data

US 2012/0097590 A1    Apr. 26, 2012

Related U.S. Application Data

(63) Continuation-in-part of application No. 13/005,309, filed on Jan. 12, 2011, now Pat. No. 8,372,274.

(60) Provisional application No. 61/282,281, filed on Jan. 13, 2010.

(51) Int. Cl.
*C02F 3/00* (2006.01)
*C02F 3/12* (2006.01)
*C02F 3/10* (2006.01)
*C02F 1/48* (2006.01)
*C02F 3/06* (2006.01)

(52) U.S. Cl.
CPC ............. *C02F 3/1242* (2013.01); *C02F 3/105* (2013.01); *C02F 2203/008* (2013.01); *C02F 1/485* (2013.01); *C02F 3/06* (2013.01); *C02F 3/1247* (2013.01)
USPC ........ 210/201; 210/532.2; 210/205; 210/207; 210/200; 210/258

(58) Field of Classification Search
USPC ............... 210/201, 532.2, 205, 207, 200, 258
See application file for complete search history.

(56) References Cited

U.S. PATENT DOCUMENTS

| | | | |
|---|---|---|---|
| 3,713,543 A | 1/1973 | Heaney | |
| 4,051,039 A | 9/1977 | Heaney | |
| 5,104,525 A | 4/1992 | Roderick | |
| 5,326,446 A | 7/1994 | Binger | |

(Continued)

FOREIGN PATENT DOCUMENTS

| | | | |
|---|---|---|---|
| DE | 43 43 792 A1 | 6/1995 | |
| GB | 1165938 | * 10/1969 | |
| JP | 2000042578 A | * 2/2000 | |
| WO | WO 98/58855 A1 | 12/1998 | |

OTHER PUBLICATIONS

"Duromaxx Brochure"; http://www.contech-cpi.com/DesktopModules/Bring2mind/DMX/Download.aspx?Command=Core_Download&EntryId=2037&PortalId=0&TabId=144; 8 pages, printed from Internet on Feb. 1, 2011.

*Primary Examiner* — Chester Barry
(74) *Attorney, Agent, or Firm* — Richard C. Litman

(57) ABSTRACT

The wastewater treatment system includes a hollow, elongate, horizontally disposed, cylindrical body made from plastic is adapted for water storage and treatment. The cylindrical body includes reinforcement ribs formed by a helically wound steel band embedded in the plastic and extending between opposite open ends of the elongate cylindrical body. A voltage source selectively energizes the steel band. A pair of bulkhead members respectively extends across and covers opposite ends of the cylindrical body. A fluid-tight wall is mounted in the cylindrical body, the first bulkhead member, the fluid-tight wall and the cylindrical body forming a fluid-tight tank defining a liquid storage chamber. The second bulkhead member and the fluid-tight wall define a dry liquid treatment equipment chamber. An inlet pipe extends into the tank for admitting the pretreatment liquid into the tank. An outlet pipe extends from the tank and discharges the treated liquid from the tank.

20 Claims, 32 Drawing Sheets

(56) References Cited

U.S. PATENT DOCUMENTS

| | | |
|---|---|---|
| 6,228,255 B1 | 5/2001 | Peterson et al. |
| 6,393,775 B1 | 5/2002 | Staschik |
| 6,413,427 B2 | 7/2002 | Tipton et al. |
| 6,616,839 B1 | 9/2003 | Peterson et al. |
| 7,004,202 B2 | 2/2006 | Bateman et al. |
| 7,008,538 B2 | 3/2006 | Kasparian et al. |
| 7,174,922 B2 | 2/2007 | Bateman et al. |
| 7,276,155 B1 | 10/2007 | Ricketts |
| 7,279,100 B2 | 10/2007 | Devine |
| 7,288,192 B2 | 10/2007 | Jowett |
| 7,318,894 B2 | 1/2008 | Juby et al. |
| 7,410,584 B2 | 8/2008 | Devine |
| 7,445,715 B2 | 11/2008 | Pehrson et al. |
| 2001/0045390 A1 | 11/2001 | Kim et al. |
| 2002/0189173 A1 | 12/2002 | Staschik |
| 2004/0188447 A1 | 9/2004 | Bolzer |
| 2005/0115478 A1 | 6/2005 | Pope et al. |
| 2005/0247623 A1 | 11/2005 | Petrone |
| 2007/0199875 A1 | 8/2007 | Moorey et al. |
| 2009/0071900 A1 | 3/2009 | Kulick, III et al. |
| 2010/0314302 A1 | 12/2010 | Lambert et al. |

* cited by examiner

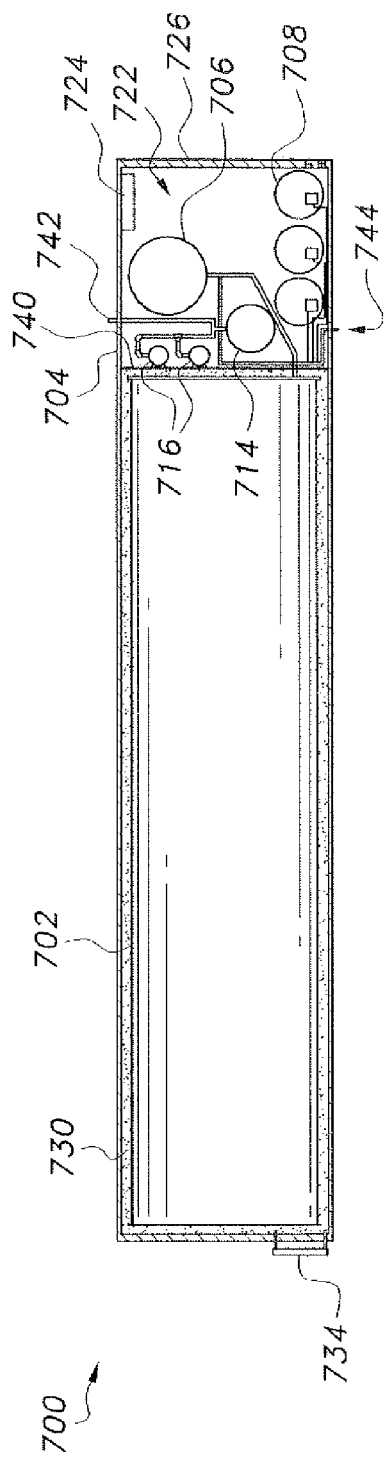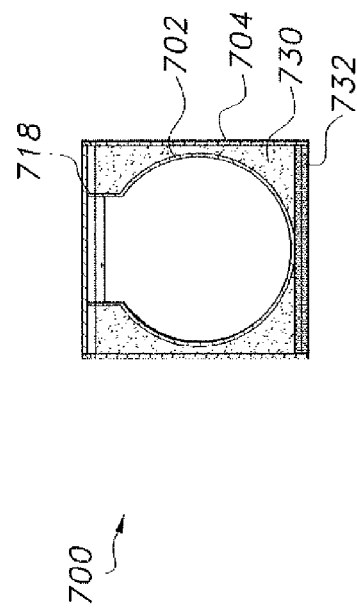
Fig. 22
Fig. 23

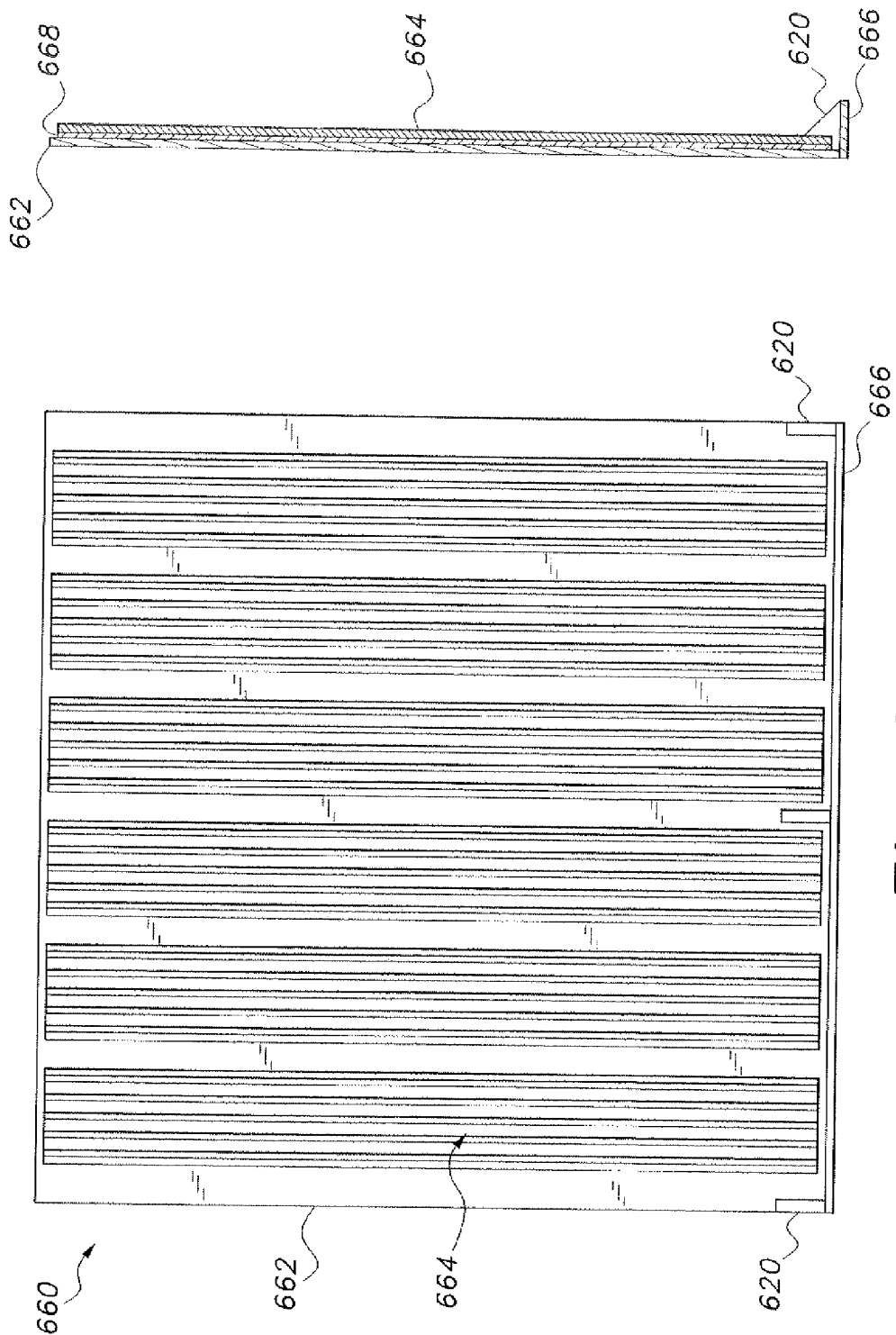

WASTEWATER TREATMENT SYSTEM

CROSS-REFERENCE TO RELATED APPLICATION

This application is a continuation-in-part of U.S. patent application Ser. No. 13/005,309, filed Jan. 12, 2011, now U.S. Pat. No. 8,372,274 which claims the benefit of U.S. Provisional Patent Application Ser. No. 61/282,281, filed Jan. 13, 2010.

BACKGROUND OF THE INVENTION

1. Field of the Invention

The present invention relates to water supply treatment systems, and particularly to a wastewater treatment system that removes biodegradable fats, oil, grease, solids, organic contaminants, nutrients, pathogens and the like from wastewater generated in residential homes, commercial businesses, industrial facilities, municipal facilities, agricultural facilities and the like. The present invention further relates to water storage tanks and the like.

2. Description of the Related Art

In order to protect the environment and promote public health, communities typically require wastewater treatment. The discharge of untreated wastewater is not suitable, since it gives rise to numerous environmental concerns, such as the pollution of surface and groundwater resources. Untreated wastewater contains organic matter and nutrients that, if left untreated and not removed from the waste stream, can result in environmental pollution. Thus, when untreated wastewater is released into either aboveground bodies of water or subsurface drainfields, the level of dissolved oxygen in the receiving waters begins to deplete, which endangers the water bodies themselves, along with the resident plant and aquatic life. Additionally, in developing nations, where potable water is scarce, it is often desirable to recover as much reclaimable water as possible from wastewater, rather than disposing of both the wastewater and the contaminants.

To treat wastewater, communities in highly populated areas commonly collect wastewater and transport it through a series of underground pipes to a large, centralized wastewater treatment plant. However, there are several problems associated with large, centralized treatment plants. Centralized wastewater treatment plants are designed and rated for processing a specific flow rate of wastewater per day, typically expressed as the rated capacity of the plant, and all treatment plants have a maximum flow rate capacity. Thus, if a centralized treatment plant receives more wastewater on a particular day than what the plant was designed to handle, problems are encountered. For example, when a treatment plant receives larger-than-normal amounts of untreated raw wastewater, treatment performance decreases and partially treated or untreated wastewater is released into a body of water, such as a river, in order not to exceed the amount of wastewater the plant was designed to handle.

As noted above, discharge of this untreated wastewater into bodies of water will endanger and kill resident plant and aquatic life in the water. Untreated wastewater also contains a number of disease pathogens that are extremely harmful to humans. For example, untreated wastewater is one of the leading causes of dysentery, which can be life threatening. Thus, if a significant amount of untreated wastewater is discharged into a body of water, that body of water will become unavailable for human consumption. On the other hand, if the treatment plant processes the larger-than-normal amounts of untreated wastewater, instead of diverting a portion into a body of water, the influx of untreated wastewater would wash away the bacteria populations or biomass used by the plant to treat the untreated wastewater, which would disrupt the entire biological treatment process of the plant. Further, as noted above, wastewater treatment is particularly needed in developing nations, and such large-scale treatment plants may not be available.

In rural areas and in developing nations, construction of centralized wastewater treatment plants may be too expensive to build and maintain. In addition, the cost of connecting residences and businesses in rural areas to a centralized treatment plant via sewage lines may be impracticable due to the greater distance between the those residences and businesses. In such areas, septic systems are usually utilized to treat wastewater. A septic tank is typically a large tank located underground on an owner's property. Septic tanks are categorized as continuous flow systems because wastewater flows into the septic tank at one end, and the same amount of wastewater that entered will exit the tank at the other end. The purpose of a septic tank is to provide a minimal amount of anaerobic treatment and to retain any solids in the wastewater to allow only the liquid wastewater effluent to pass through to prevent drain field disposal lines from becoming clogged. However, since the wastewater leaving the septic tank has only been minimally treated, the wastewater will be a detriment to the environment due to its organic and nutrient contaminants, as noted above, and may not be recovered as reclaimed water. Furthermore, as solids build up inside the septic tank, a phenomenon known as periodic upset may occur, causing solids to flow out of the septic tank and into the field lines connected to the tank. Eventually, these field lines will clog due to the buildup and carryover of solids. When this occurs, the field lines have to be cleaned or replaced, if possible, which means destruction to a portion of the owner's property as well as increased expense to the owner. A more extreme condition would be the failure of the drain field without an adequate replacement area on the property.

Further, it has been found that certain soils are only capable of receiving and dispersing a limited amount of wastewater, given the particular soil structure, geology, and groundwater conditions. In this instance, practice has shown that a highly treated wastewater can be discharged to drainfields possessing limited hydraulic and/or soil treatment capacity. Furthermore, a high quality effluent can be reclaimed and used for secondary purposes, such as irrigation, industrial rinse and cooling, and grey water uses, for example.

Centralized wastewater treatment systems that treat over 1,500 gallons per day typically utilize either concrete, steel or fiberglass tanks to house the systems. These materials have been utilized for decades, due to the unavailability of other options. Concrete and steel, due to their particular material properties, are highly subject to corrosion and are not suited to withstand the corrosive gases and fluctuations in pH common in wastewater and wastewater treatment.

Further, both concrete and steel tanks are difficult and expensive to fabricate, transport and install. The average life expectancy of a concrete or steel wastewater tank is only between twenty and thirty years. Furthermore, to date, the only tank material option for large wastewater treatment systems over 100,000 gallons per day is concrete. Fiberglass, although a more tolerant material with a longer life expectancy, is limited in its detailing capabilities and delaminates when subjected to a sharp pressure point or conditions of constant friction.

Fiberglass tanks are typically constructed utilizing pre-developed molds and are relatively inflexible in adjustment to specific project requirements. This inflexibility results in additional required tankage, yard piping and mechanical equipment, thus resulting in increased maintenance and operational issues and expenses.

Additionally, steel, concrete and fiberglass tanks are all relatively difficult to repair when damaged. An additional option for wastewater treatment systems under 1,500 gallons per day is the utilization of rotationally or injection molded plastic tankage as the housing. Such tanks are commonly used for septic tanks, grease traps and small treatment systems. However, the overall majority of these tanks are prone to crushing when emptied and are limited in size due to the pre-developed molds. It would be desirable to form such tankage from a material that would alleviate these problems.

With regard to water storage, present conventional water storage tanks are typically fabricated from concrete, steel, fiberglass or molded plastic. Tanks are installed in both aboveground and belowground applications and also in mobile applications. The belowground applications are typically constructed from concrete, steel or fiberglass. Molded plastic is used on a limited basis and in small volumes due to structural inadequacies in buried applications. Steel and concrete systems have limited life expectancies due to the material makeup previously noted. Fiberglass tanks are limited in their volumes due to pre-developed molds and are much more expensive on a first-cost basis. Thus, it would be desirable to provide a water storage tank formed from a material which permits the direct burial of the tank with same structural integrity as concrete, steel and fiberglass but with two to three times the life expectancy. The direct burial of the tank would offer greater flexibility with regard to land use, and for other purposes, while reducing concerns related to vandalism, terrorism and weather-related damage. Such a storage tank should have a very long service life, with installation and maintenance costs associated therewith being lower than those associated with conventional water storage tanks.

Tanks formed from conventional materials are relatively heavy, thus making transportation difficult and expensive. Further, present mobile water storage tanks are subject to structural damage and severe temperatures. It would be desirable to provide a water storage tank which could be easily and economically transported, adequately insulated to protect materials stored therein from severe temperatures, and having two separated and independent structurally sound shells for protection.

Current underground water treatment systems typically require an external building to house and protect the treatment and pumping equipment required of the system, which is separate from the vessel. The external building and its enclosed equipment must be assembled in the field. This current standard is time intensive and typically involves numerous trades and materials. The construction phase also opens the possibility of vandalism and theft, and the finished product is susceptible to natural disasters, such as hurricanes, tornados, earthquakes and the like. These concerns are of primary importance in developing countries and areas prone to natural disasters, or in areas where security is minimal.

Furthermore, mobile containerized water treatment systems, while quickly mobilized, watertight and protected, are limited in treatment volumes by the container size. It would be desirable to provide a water treatment, storage and equipment housing system within a single watertight and protected structure and also having unlimited water treatment capacities.

Thus, a wastewater treatment system solving the aforementioned problems is desired.

SUMMARY OF THE INVENTION

The wastewater treatment system is a portable, pre-assembled system that collects and treats wastewater. The system includes either small, vertically disposed tankage or larger, horizontally disposed cylindrical tankage connected to an inlet and outlet pipe. Preferably, the tankage, or housings, is formed from steel-reinforced plastic. The horizontal configuration systems are expandable in the field by butt-welding tanks end-to-end, preferably utilizing known thermoplastic fuse welding techniques.

The wastewater treatment system provides multiple techniques for decontaminating wastewater contained within a single system, thus optimizing the decontamination of the wastewater. The system may be sized to serve a single home, a cluster of homes and businesses, a municipality, or single or multiple industrial or agricultural facilities. The wastewater treatment system includes a tank, which is preferably cylindrical and may be manufactured from steel-reinforced plastic or the like, having at least one chamber defined therein. The system includes the tank, which defines at least one internal chamber therein, the tank preferably being formed from steel-reinforced plastic. An inlet port forms a conduit for inlet of wastewater into the at least one chamber, and an outlet port forms a conduit for discharge of treated wastewater from the tank. Preferably, the at least one chamber defines a gravity clarifier chamber for precipitating solid waste from the wastewater for collection thereof.

In one embodiment, the housing includes first and second partition walls dividing the tank into first, second and third chambers. The first chamber includes at least one first effluent filter and further contains anaerobic bacteria for removal of organic waste and nutrients, such as nitrogen, from the wastewater received therein. The first chamber is configured for at least partial removal of particulate and organic matter from the wastewater.

An inlet port forming a conduit for inlet of the wastewater into the first chamber is provided through an outer housing of the system. Similarly, an outlet port forming a conduit for discharge of treated wastewater from the third chamber is further provided. A first port is formed through the first partition wall for selective transfer of the wastewater from the first chamber to the second chamber. The second chamber includes an air diffuser and further contains aerobic bacteria for further removal of organic waste material from the wastewater received therein. A stationary fixed film or floating media assembly is provided for fostering growth of the aerobic bacteria within the second chamber. The microorganisms contained within the second chamber are commonly referred to as "activated sludge" or "biomass", and are more specifically referred to as "suspended growth" and "attached growth" bacteria.

A second port is formed through the first partition wall for selective transfer of the wastewater from the second chamber to the third chamber. The third chamber includes a return activated sludge pump assembly and at least one second effluent filter. A third port is formed through the second partition wall for selective transfer of settled waste solids from the third chamber to the first chamber. Resultant purified water is selectively discharged from the outlet port, after passing through the second effluent filter. Preferably, the tank is equipped with a bottom plate, which serves as an antifloatation collar, thereby preventing inadvertent floatation of an empty tank that may occur during or after construction.

An alternative liquid storage tank is further provided. The liquid storage tank is adapted for underground burial. The liquid storage tank also includes a hollow, elongate, cylindrical body made from plastic, with the cylindrical body having reinforcement ribs formed by a helically wound steel band embedded in the plastic and extending between opposite open ends of the elongate cylindrical body. A pair of bulkhead members respectively extend across and cover the opposite open ends of the cylindrical body. The pair of bulkhead members and the cylindrical body form a fluid-tight tank defining at least one chamber adapted for storing liquid therein.

An inlet pipe extends into the tank, and is adapted for admitting the liquid into the tank. Similarly, an outlet pipe extends from the tank, and is adapted for discharging the liquid from the tank. An overflow outlet pipe further extends from the tank, the overflow outlet pipe being positioned above the outlet pipe.

In a further alternative embodiment, the liquid storage tank includes a hollow, elongate, cylindrical body made from plastic and having reinforcement ribs formed by a helically wound steel band embedded in the plastic and extending between opposite open ends of the elongate cylindrical body. The tank further includes a pair of bulkhead members respectively extending across and covering the opposite open ends of the cylindrical body. The pair of bulkhead members and the cylindrical body form a fluid-tight tank defining at least one chamber adapted for storing liquid therein. A system for treatment of the liquid is further provided, and an inlet pipe extends into the tank, the inlet pipe being adapted for admitting the liquid into the tank. Similarly, an outlet pipe extends from the tank, the outlet pipe being adapted for discharging the liquid from the tank.

An overflow outlet pipe extends from the tank, the overflow outlet pipe being positioned above the outlet pipe. An external housing is provided, and the hollow, elongate, cylindrical body and the liquid treatment system may be received therein. The external housing may be configured as a cargo container.

Additionally, the cylindrical body may be alternatively extended to house a watertight and protected equipment room. In this embodiment, the external end of the equipment room preferably includes a bulkhead having hinged and lockable door for access.

These and other features of the present invention will become readily apparent upon further review of the following specification and drawings.

BRIEF DESCRIPTION OF THE DRAWINGS

FIG. 22 is a top view in section of the water treatment and storage system of FIG. 20.

FIG. 23 is a cross-sectional view of the water treatment and storage system of FIG. 20.

FIG. 25 is a front view of stiffener bulkhead of the water storage tank of FIG. 24.

FIG. 26 is a side view in section of the stiffener bulkhead of FIG. 25.

Similar reference characters denote corresponding features consistently throughout the attached drawings.

DETAILED DESCRIPTION OF THE PREFERRED EMBODIMENTS

Figure 1:
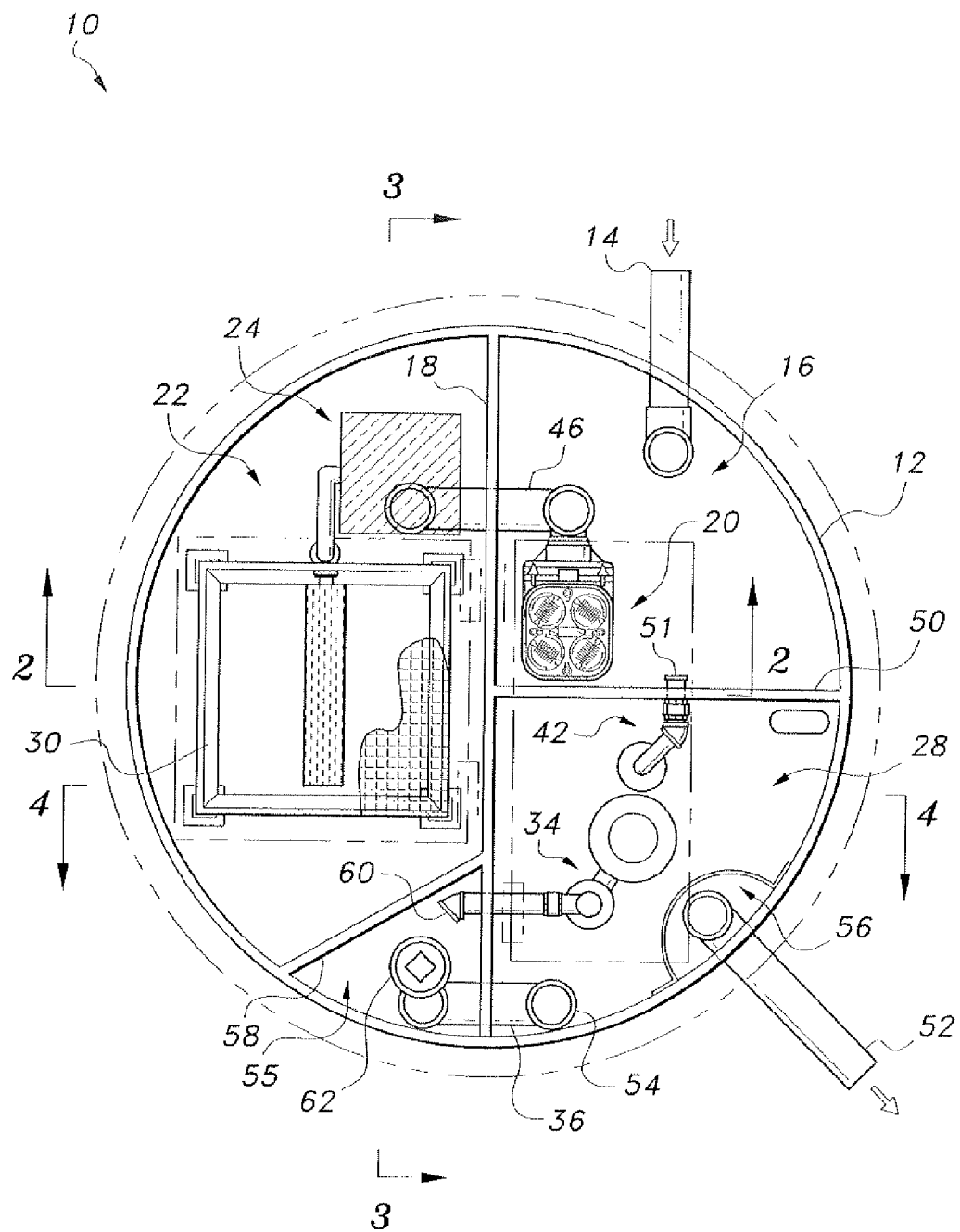
FIG. 1 is a diagrammatic top view of a wastewater treatment system according to the present invention, shown with the upper cover removed.

Referring to FIGS. 1-4, in a first embodiment, the wastewater treatment system 10 is preferably formed as a single enclosed unit contained within a housing 12. The housing 12 is substantially cylindrical, and is preferably formed from steel-reinforced plastic or the like. As will be described in detail below, the system 10 provides three separate techniques for decontaminating wastewater contained within the single system, thus optimizing the decontamination of the wastewater.

The wastewater treatment system 10 includes the housing 12 forming an outer tank, and first and second partition walls 18, 50, respectively, dividing the tank into first, second and third chambers 16, 22, 28, respectively. The first partition wall 18 generally bisects the cylindrical housing 12 diametrically, and the second partition wall 50 is orthogonal to the first partition wall 18, extending radially and generally bisecting one of the two semicylindrical spaces formed by the first partition wall 18. The first chamber 16 preferably houses an anoxic environment and includes at least one first effluent filter 20, and further contains anaerobic and facultative bacteria for the removal of organic waste material and nitrogen from the wastewater received therein. The first chamber 16 is configured for at least partial removal of particulate and organic matter from the wastewater. The housing 12 may be formed from steel-reinforced plastic or any other suitable material.

An inlet port 14 (with a downpipe assembly) forming a conduit for inlet of the wastewater into the first chamber 16 extends through the outer housing 12 of the system 10. Similarly, an outlet port 52 forming a conduit for discharge of treated wastewater from the third chamber 28 is further provided. Untreated, raw wastewater enters the first chamber 16 through the inlet port 14 from residential or small commercial facilities. For example, the system 10 may receive approximately 1,500 gallons per day from a residential or small commercial producer of wastewater. High-quality, purified effluent is discharged through the outlet port 52 to be received by an alternative subsurface drainfield (such as a gravel trench or drip irrigation system), or may be directly discharged into a stream or other body of water, or may further be re-used for spray irrigation or the like.

The overall configuration, including the dimensions and configuration of the system 10, may vary. An exemplary system 10 capable of processing 500 gallons of wastewater per day may have a substantially cylindrical outer housing 12 having a diameter of approximately six feet and a height of approximately six feet. An exemplary system of similar configuration but capable of processing 750 gallons per day may have a diameter of approximately seven feet and a height of approximately six feet. Similarly, a system 10 capable of processing 1,000 gallons per day may have a diameter of approximately eight feet and a height of six feet, and a system 10 capable of processing 1,500 gallons per day may have a diameter of approximately ten feet and a height of six feet. Preferably, the housing 12 is configured for burial within the ground.

When wastewater is received within the first, anoxic chamber 16, untreatable materials that are indigestible to the anaerobic bacteria contained therein are filtered by the effluent filter 20, preventing their transfer to the second, bioreactor chamber 22. The first chamber 16 provides the first stage of wastewater treatment and organic digestion, and may be complemented by recycled wastewater from additional downstream tanks. Preferably, the anoxic chamber 16 has a very low dissolved oxygen content of approximately 0.5 mg/L or less, thus fostering microbial metabolism typically associated with nitrogen removal from a wastewater stream (i.e., anaerobic or facultative bacteria). Any suitable strain of anaerobic bacteria known for digesting organic materials in wastewater may be utilized, as is well known in the field of wastewater treatment. Similarly, any suitable type of effluent filter may be utilized. The effluent filter 20 is preferably removable, allowing for easy replacement or repair thereof.

Preferably, the bacteria in the system 10 are naturally occurring species of microorganisms, which are typically already found in abundance in wastewater streams. It should be noted that the system 10 primarily uses bacteria known for nutrient removal in the digestion and removal of the organic and nutrient wastewater components. Microorganisms that may be used for this purpose include nitrobacter and nitrosomas, as well as other similar, numerous species possessing similar biologic and metabolic characteristics. These and similar microorganisms are facultative, and change their metabolism depending upon the amount of dissolved oxygen present in the wastewater treatment plant. By recycling from an anaerobic zone to an aerobic zone and then back to the anaerobic zone, as will be described below, these facultative microorganisms eventually metabolize nitrogen compounds so that gaseous nitrogen is released into the atmosphere.

Figure 2:
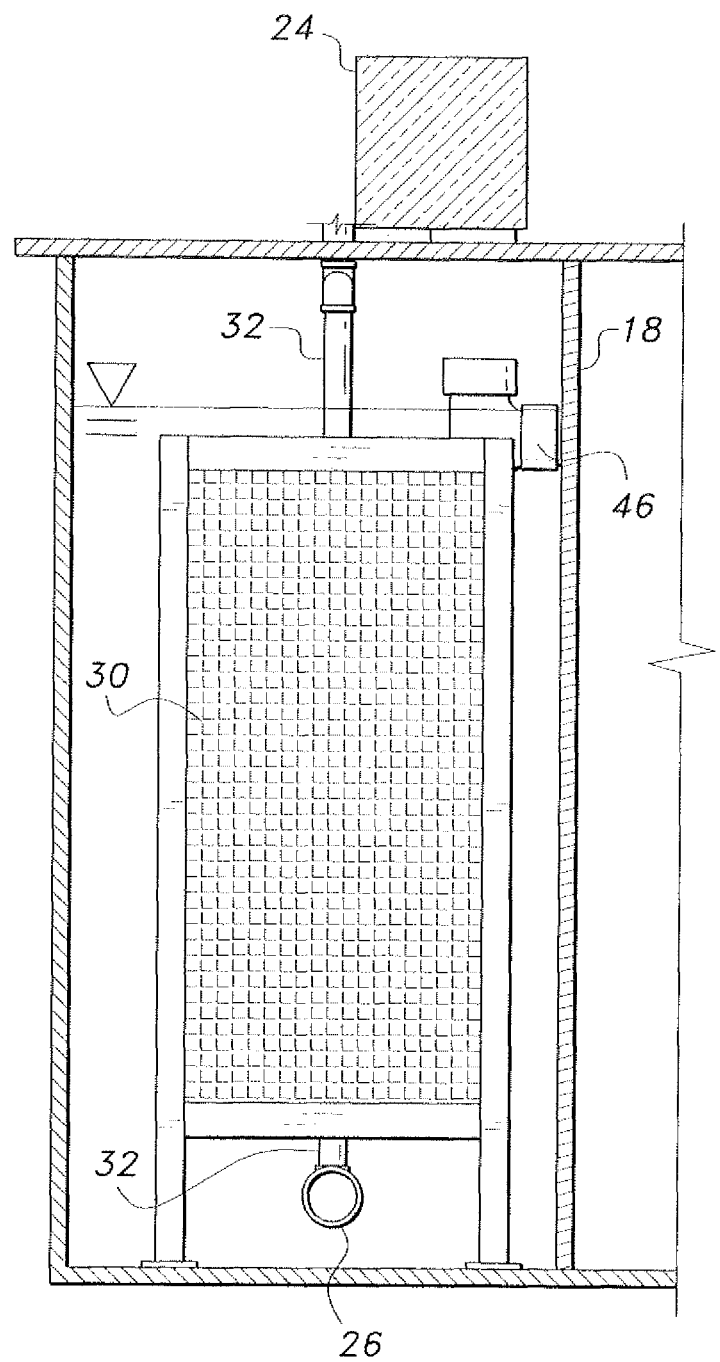
FIG. 2 is a partial, diagrammatic section view of the wastewater treatment system, taken along lines 2-2 of FIG. 1.
Figure 3:
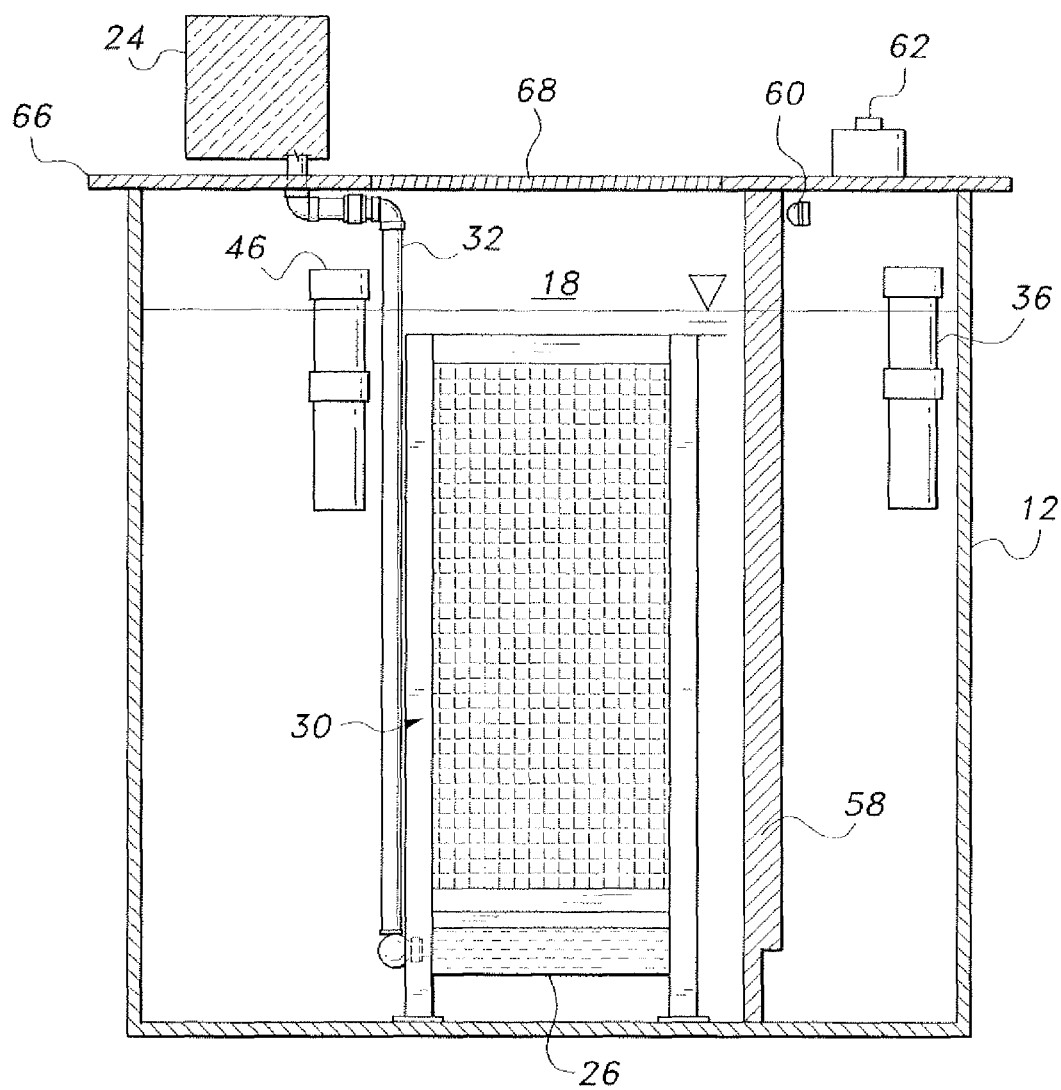
FIG. 3 is a partial, diagrammatic section view of the wastewater treatment system, taken along lines 3-3 of FIG. 1.

A first port is formed through the first partition wall 18 for selective transfer of the partially treated wastewater from the first chamber 16 to the second chamber 22. As best shown in FIGS. 2 and 3, treated wastewater passes through an inlet pipe 46 (with a downpipe assembly) into the main body of the second chamber 22. Preferably, the partially treated wastewater flows under the force of gravity from the first chamber 16 to the second chamber 22, with no additional pumping required. Any suitable type of valving may be utilized to regulate and control the flow of the wastewater through the first port and inlet pipe 46.

Figure 4:
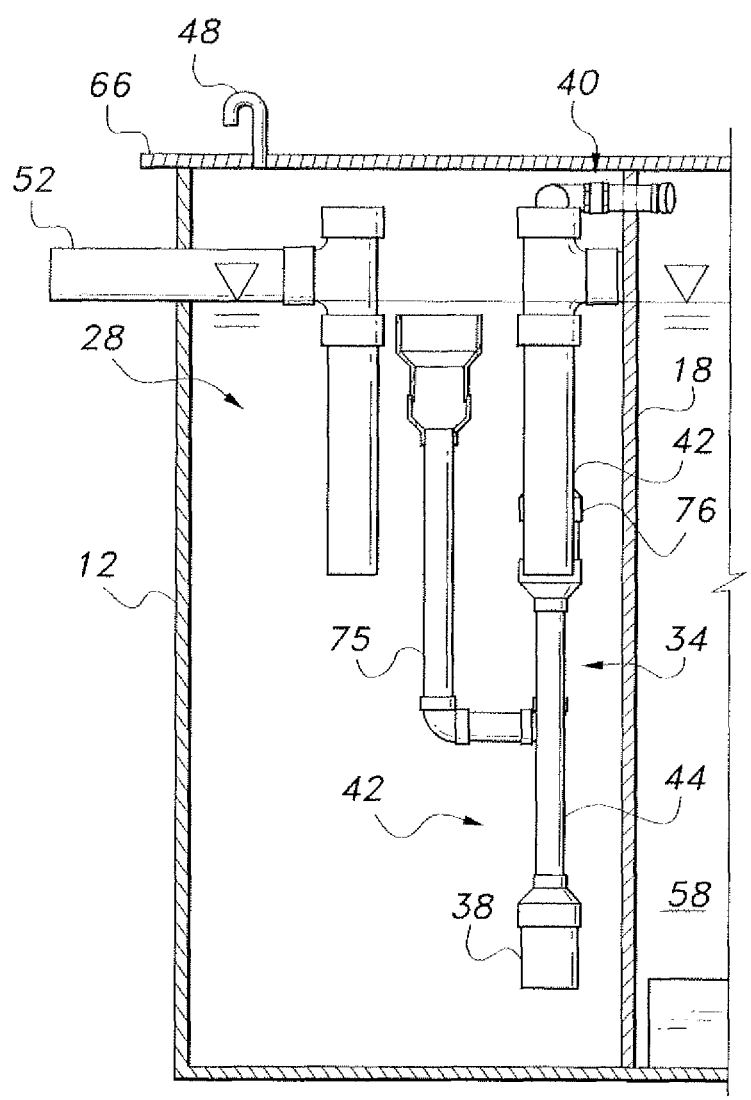
FIG. 4 is a partial, diagrammatic section view of the wastewater treatment system, taken along lines 4-4 of FIG. 1.

The second chamber 22 includes an air diffuser 26, and further contains aerobic bacteria for further removal of organic waste material from the wastewater received therein. A fixed film assembly 30 is provided for receiving and fostering growth of the aerobic bacteria within the second chamber 22. A blower assembly 24, a linear air pump, or any other suitable source of compressed or pressurized air is provided for delivering air through the air diffuser 26 via conduit 32 (best shown in FIG. 3). The air diffuser 26 may be a membrane air diffuser producing a stream of fine air bubbles, a coarse air diffuser or any other suitable type of air diffuser for aerating and mixing the partially treated wastewater contained in the second chamber 22. Preferably, the blower 24 includes a pressure release valve, allowing for user-controllable air flow adjustment and waste air release. The blower assembly 24, or any other suitable source of pressurized air, may be located in any suitable location, and may provide air to the diffuser 26 through any suitable type of piping or the like. The air pump and diffuser assembly provide primary aeration so that the dissolved oxygen content in the second chamber 22 is a minimum of approximately 2.0 mg/L. The air pump further provides actuation of the scum removal system 34 and return activated sludge pumping system 42, as shown in FIG. 4.

The fixed film assembly 30 may be perforated plastic tubing, a plurality of floating individual plastic media objects, or the like, which serve as a surface for the aerobic bacteria to grow and bond onto. Any suitable type of aerobic bacteria used in the removal of organic wastes may be utilized. A second port is formed through the first partition wall 18 for selective transfer of the wastewater from the second chamber 22 to the third, or clarifying, chamber 28. Preferably, the partially treated wastewater (commonly referred to as a "mixed liquor") flows from the second, bioreactor chamber 22 into the stilling well 55 formed behind baffle wall 58, and then into the third, clarifying chamber 28 under the force of gravity, through pipe 36 with downpipe assemblies at port 54, with no additional pumping being required.

Preferably, the fixed film assembly 30 is permanently attached to the interior of the second chamber 22. As noted above, any suitable type of air diffuser 26 may be utilized, such as a membrane air diffuser or a coarse air diffuser. It should be understood that the orientation of the air diffuser 26, shown in FIG. 3, is shown for exemplary purposes only. The air diffuser 26 may have any suitable orientation, and is preferably removable, allowing for repair or replacement thereof.

The return activated sludge pumping system 42 in the third chamber 28 utilizes a siphon-ejection air lift assembly, which pumps the gravity-settled suspended solids from the mixed liquor at a selectable pre-determined rate of approximately four times the system flow back into the first anoxic chamber 16 through a conduit. A third port 51, formed through the second partition wall 50, allows for the selective transfer of the suspended waste solids from the third chamber 28 to the first chamber 16. Preferably, a second surface scum removal system 34, utilizing another siphon-ejection air lift assembly, is provided for collecting scum from the clarifier surface and pumping this material back to the stilling well 62 at a rate of approximately one-tenth of the system design flow. A pipe wasting air from the blower assembly may be provided to direct excess air to the clarifier surface, so that air flow forces floating scum and solids toward the scum removal pump system 34. The return activated sludge pump assembly 42 and the scum removal pump assembly 34 may be regulated by any suitable type of valving, such as an air needle valve block assembly. The needle valves control the flow of pressurized air through a flexible hose or rigid conduit to each siphon-ejection air lift assembly.

The floating scum in chamber 28 is received and collected via inlet pipe 75, and the waste exits into the stilling well 55 behind the baffle wall 58 at port 60, via a siphon-ejection pump 76 mounted below, and connected to, forcemain 40. The return activated sludge is returned back into the first chamber 16 via a return activated sludge siphon-ejection pump 38, which is mounted below the return activated sludge forcemain 44.

As shown in FIGS. 1 and 4, an additional stilling well assembly 56 is provided, the assembly 56 being mounted within the third chamber 28. Resultant purified wastewater is selectively discharged from the outlet port 52. Preferably, a removable effluent filter is provided for covering the outlet port 52, thus providing tertiary effluent filtration to remove any remaining clarifier floc and/or fine suspended solids prior to the effluent discharge.

The effluent filter may be formed from polyester/polyethylene/polystyrene fiber, or from a flexible foam material or the like, contained within or exterior to a perforated canister or the like connected to outlet port 52. The removable effluent filter may be contained within a separate filter sleeve assembly having a vertical, perforated plastic tube that is affixed to the clarifier floor. The effluent filter, as described above, may be any suitable type of effluent filter, and is preferably removable for easy repair or replacement thereof. Additionally, a packaged membrane effluent filter assembly may be utilized in lieu of the removable effluent filter and filter sleeve assembly.

Preferably, a relatively simple electronic control assembly is provided for user control and programming. The controls allow for the selective operation and control of the blower assembly 24, along with a timer for programmable actuation of aeration within the second chamber 22, thus allowing for energy savings and further promoting the inherent nitrogen removal biological process. A sensor and coupled alarm may further be provided for monitoring operation of the blower 24. An alarm signal is delivered to the user in the event of power or blower failure.

Figure 5:
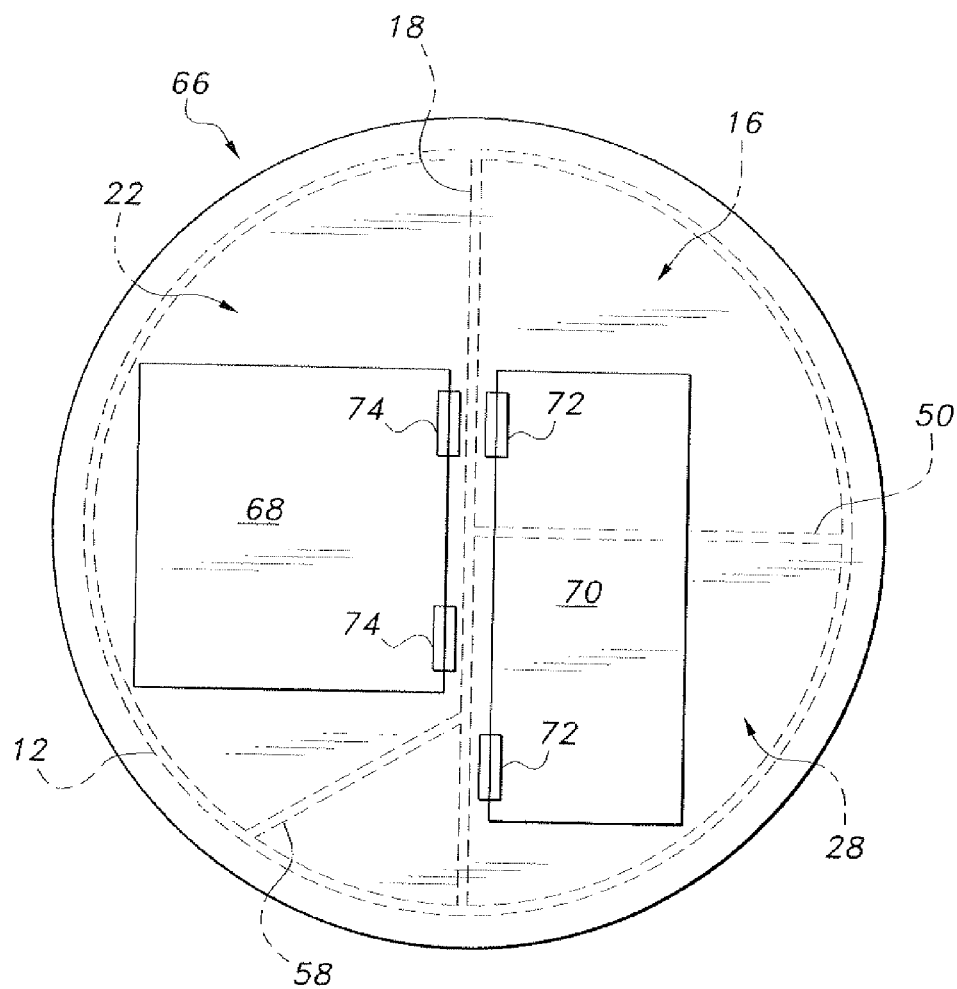
FIG. 5 is a top view of the wastewater treatment system according to the present invention.

As shown in FIG. 5, the upper cover 66 of the tank 12 preferably includes at least two hatches, the access hatch 68 being pivotally secured by hinges 74, allowing selective access to the second bio-reactor chamber 22 for repair or replacement of the air diffuser and/or film assembly. Similarly, an access hatch 70 is provided (pivotally joined to cover 66 by hinges 72) for accessing the interiors of the first chamber 16 and the third chamber 28. It should be understood that the access hatches are shown for exemplary purposes only, and that any suitable type, or number, of hatches may be utilized.

For example, in the embodiment of FIGS. 6, 7, 8 and 9, three such hatches (one for each chamber) 168, 169 and 170 are provided. Each hatch 168, 169, and 170 is configured as a manhole-type cover, rather than the hinged rectangular covers shown in FIG. 5. With such a configuration, the manhole-type hatches are preferably formed on risers, allowing at least six inches of clearance. Thus, when the housing 12 is buried in the ground, the hatches are easily accessible at ground level. A vent 48 may be incorporated into one of these risers, as a further alternative.

Returning to the embodiment of FIGS. 1-5, the outer tank or housing 12 may be formed from any suitable material, preferably a steel-reinforced plastic or the like, allowing for a suitably strong housing 12 capable of withstanding an exterior earth load (when the system 10 is buried in the ground), and which is resistant to corrosion and biological degradation. Contech Construction Products, Inc.® of West Chester, Ohio manufactures a steel-reinforced polyethylene (SRPE) material possessing a steel exterior spiral-ribbed banding that is encapsulated with a high-density polyethylene plastic, sold under the name DuroMaxx™. Such a material, or similar materials, may be used in the manufacture of the housing 12 to provide increased earth and dynamic load support. It should be understood that the DuroMaxx™ housing is the preferred housing for all embodiments of the wastewater treatment system described herein.

Referring to the alternative embodiment of FIGS. 6-9, the wastewater treatment system 100 includes the housing 112 forming an outer tank, and first and second partition walls 118, 150, respectively, dividing the tank into first, second and third chambers 116, 122, 128, respectively. The first chamber 116 preferably houses an anoxic environment and includes at least one first effluent filter 120, and further contains anaerobic and facultative bacteria for the removal of organic waste material and nitrogen from the wastewater received therein. The first chamber 116 is configured for at least partial removal of particulate and organic matter from the wastewater.

An inlet port 114 (with a downpipe assembly) forming a conduit for inlet of the wastewater into the first chamber 116 extends through the outer housing 112 of system 100. The inlet port 114 may be a 4-inch diameter PVC pipe or the like. Similarly, an outlet port 152 forming a conduit for discharge of treated wastewater from the third chamber 128 is further provided. Untreated, raw wastewater enters the first chamber 116 through the inlet port 114 from residential or small commercial facilities. For example, the system 100 may receive approximately 1,500 gallons per day from a residential or small commercial producer of wastewater. High-quality, purified effluent is discharged through the outlet port 152 to be received by an alternative subsurface drainfield (such as a gravel trench or drip irrigation system), or may be directly discharged into a stream or other body of water, or may further be used for spray irrigation or the like. Preferably, the housing 112 is configured for burial within the ground.

When wastewater is received within the first, anoxic chamber 116, untreatable materials that are indigestible to the anaerobic bacteria contained therein are filtered by the effluent filter 120, preventing their transfer to the second, bioreactor chamber 122. The first chamber 116 provides the first stage of wastewater treatment and organic digestion, and may be complemented by recycled wastewater from additional downstream tanks. Preferably, the anoxic chamber 116 has a very low dissolved oxygen content of approximately 0.5 mg/L or less, thus fostering microbial metabolism typically associated with nitrogen removal from a wastewater stream (i.e., anaerobic bacteria). Any suitable strain of anaerobic bacteria known for digesting organic materials in wastewater may be utilized, as is well known in the field of water treatment. Similarly, any suitable type of effluent filter may be utilized. The effluent filter 120 is preferably removable, allowing for easy replacement or repair thereof.

Figure 7:
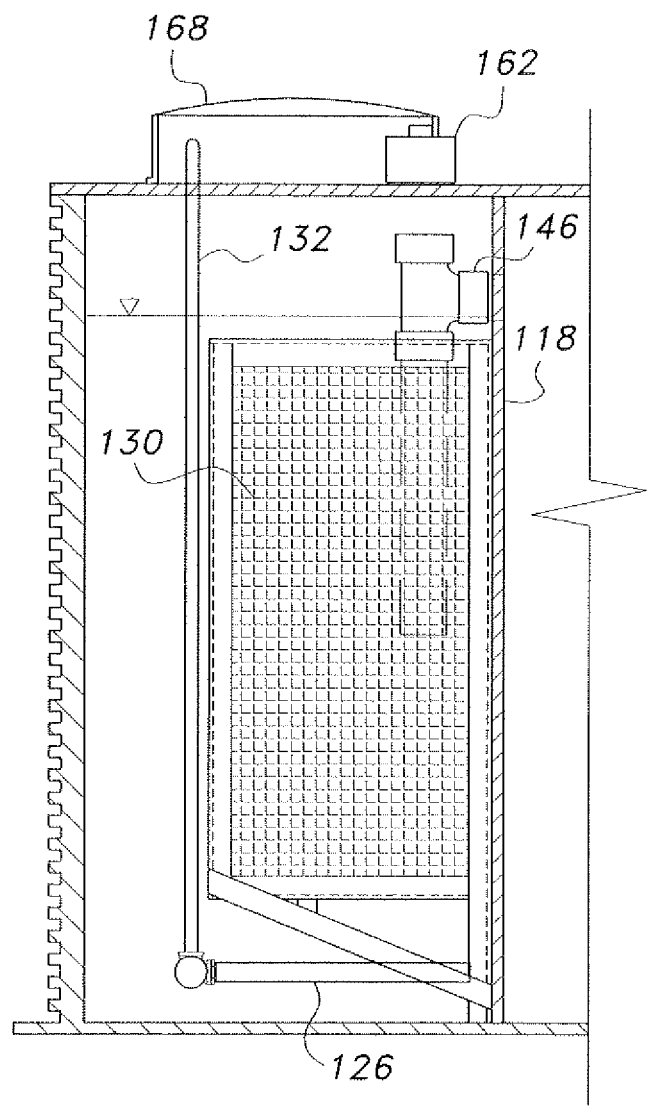
FIG. 7 is a partial, diagrammatic section view of the wastewater treatment system of FIG. 6, taken along view lines 7-7 of FIG. 6.
Figure 8:
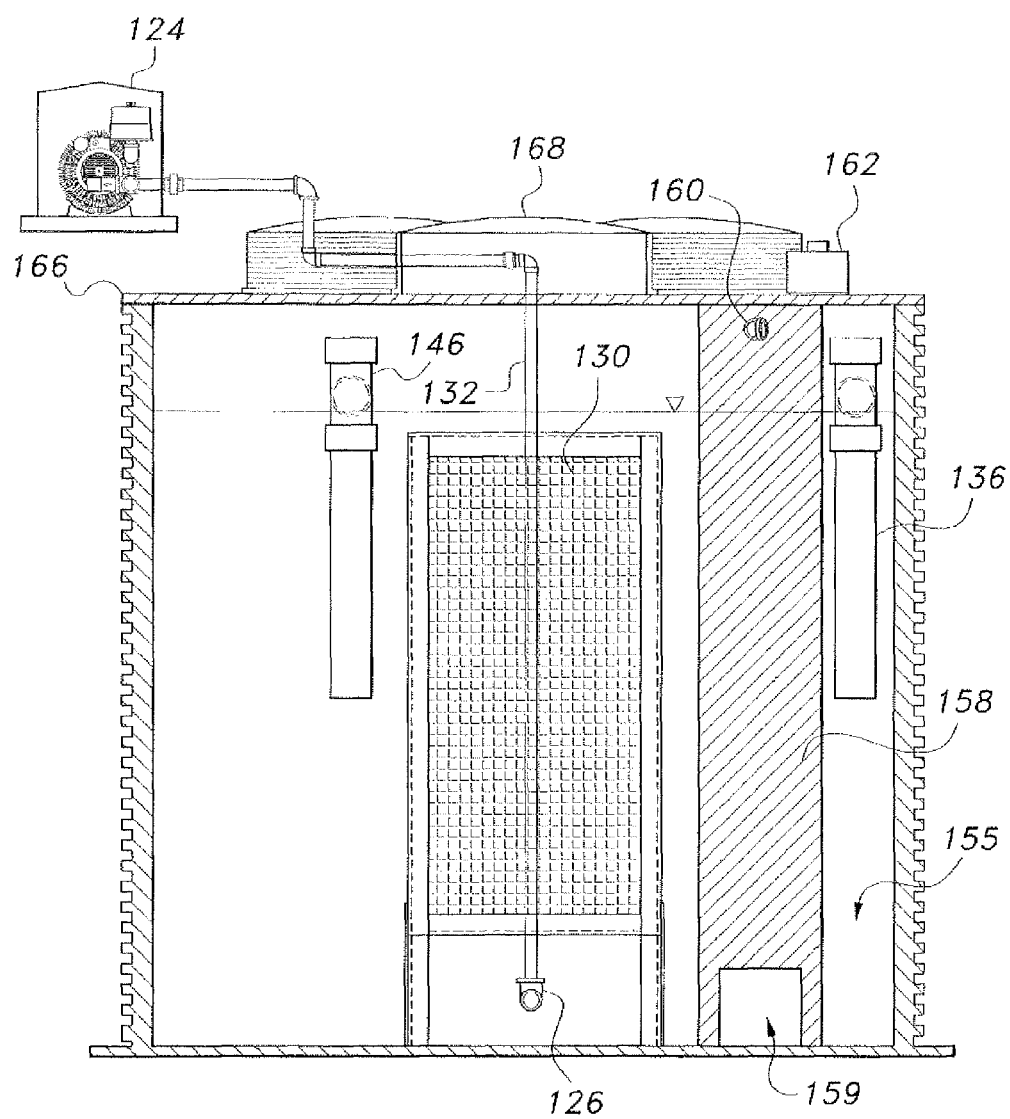
FIG. 8 is a partial, diagrammatic sectional view of the wastewater treatment system of FIG. 6, taken along lines 8-8 of FIG. 6.
Figure 9:
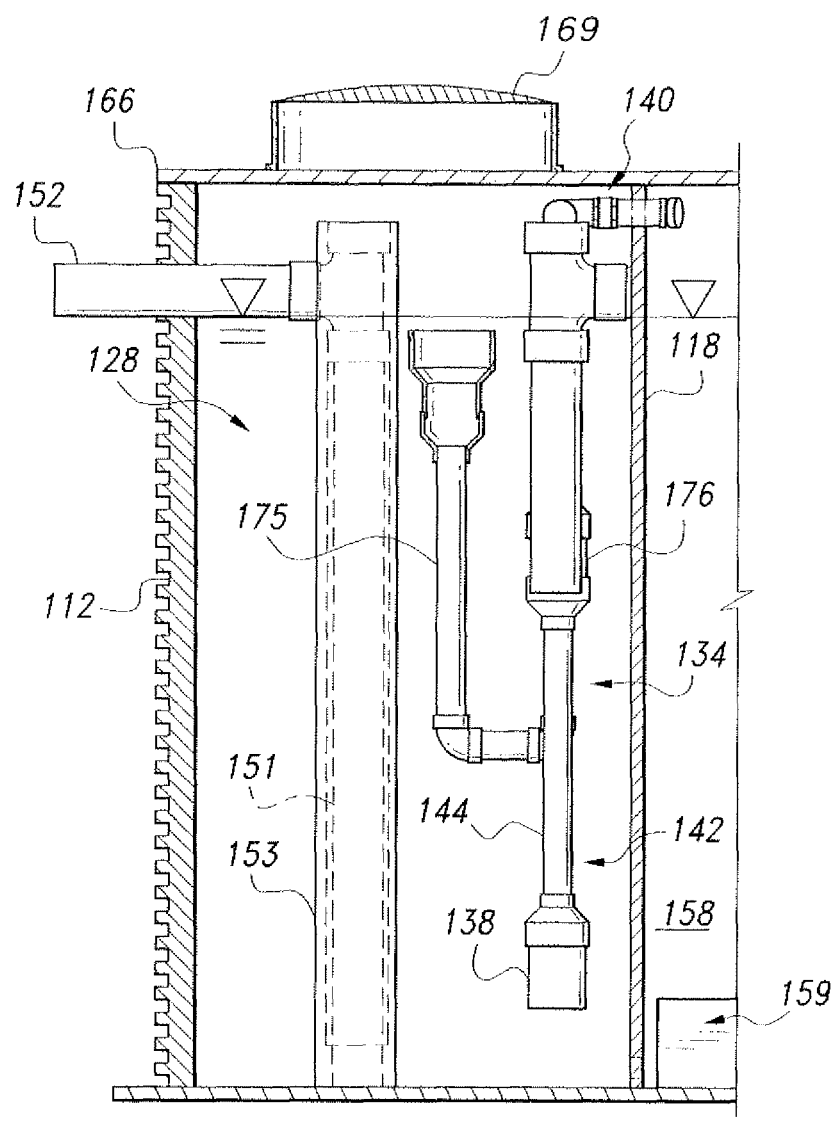
FIG. 9 is a partial, diagrammatic section view of the wastewater treatment system, taken along view lines 9-9 of FIG. 6.

A first port 146 is formed through the first partition wall 118 for selective transfer of the partially treated wastewater from the first chamber 116 to the second chamber 122. As best shown in FIGS. 7 and 8, treated wastewater passes through the inlet 146 (with downpipe assemblies) into the main body of the second chamber 128. Preferably, the partially treated wastewater flows under the force of gravity from the first chamber 116 to the second chamber 122, with no additional pumping required. Any suitable type of valving may be utilized to regulate and control the flow of the wastewater through the inlet 146.

The second chamber 122 includes an air diffuser 126, and further contains aerobic bacteria for further removal of organic waste material from the wastewater received therein. A fixed film assembly 130 is provided for receiving and fostering growth of the aerobic bacteria within the second chamber 122. A blower assembly 124, a linear air pump, or any other suitable source of compressed or pressurized air is provided for delivering air through the air diffuser 126 via a conduit 132 (best shown in FIG. 8). The air diffuser 126 may be a membrane air diffuser, a coarse air diffuser or any other suitable type of air diffuser for aerating and mixing the partially treated wastewater contained in the second chamber 122. Preferably, the blower 124 includes a pressure release valve, allowing for user-controllable air flow adjustment and waste air release. The blower assembly 124, or any other suitable source of pressurized air, may be located in any suitable location, and may provide air to the diffuser 126 through any suitable type of piping or the like. As in the previous embodiment, the air pump and diffuser assembly provide primary aeration so that the dissolved oxygen content in the chamber 122 has a minimum of approximately 2.0 mg/L. The air pump further provides actuation of the scum removal system 134 and the return-activated sludge pumping system 142.

A second port is formed through the first partition wall 118 for selective transfer of the wastewater from the second chamber 122 to the third or clarifying chamber 128. Preferably, the partially treated wastewater flows from the second, bioreactor chamber 122 into the stilling well 155 behind baffle wall 158, through baffle opening 159, and then into the third, clarifying chamber 128 under the force of gravity, with no additional pumping being required.

Figure 6:
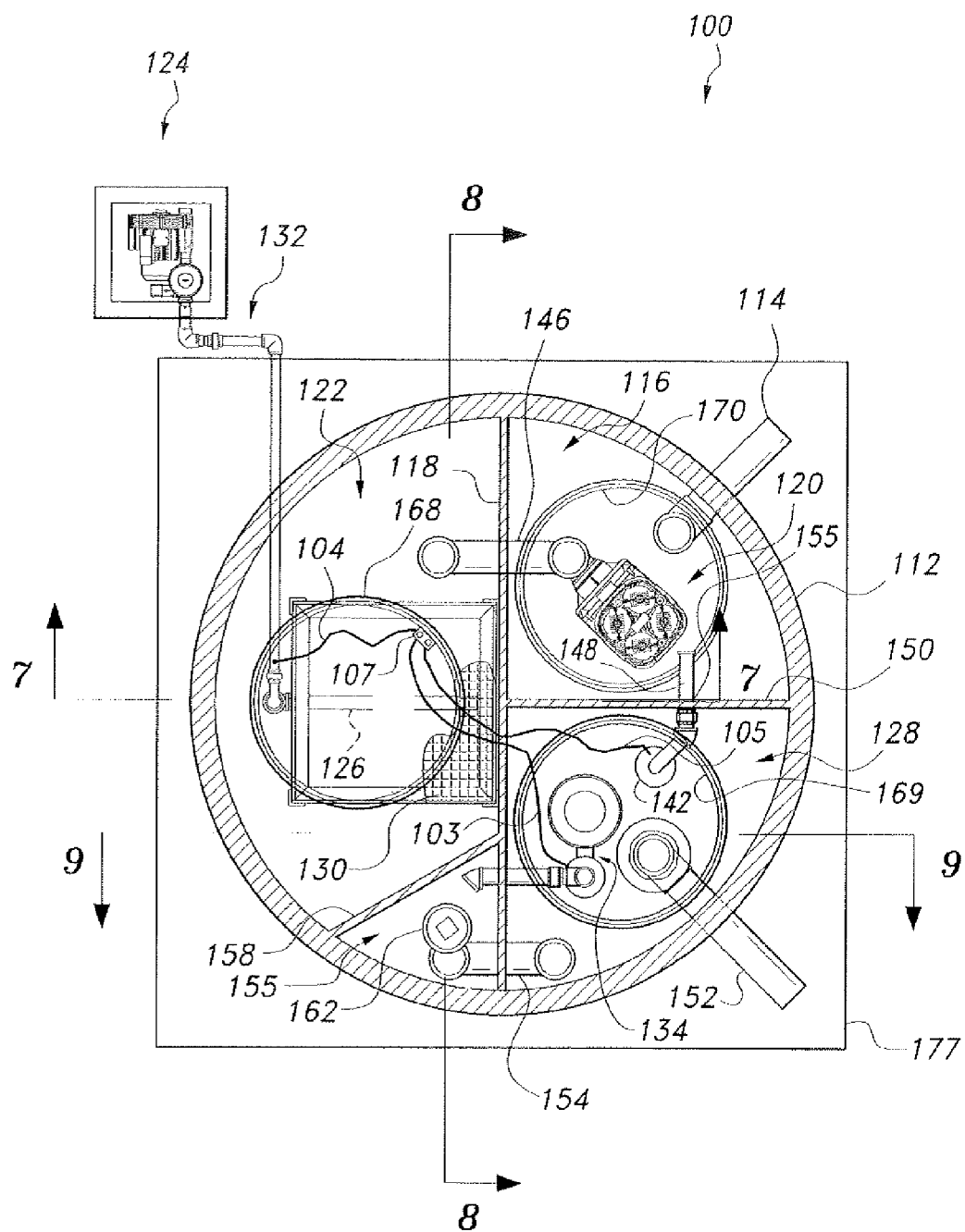
FIG. 6 is a diagrammatic top view of an alternative embodiment of a wastewater treatment system according to the present invention, shown with the upper cover removed.

The return activated sludge pumping system 142 of the third chamber 128 utilizes a siphon-ejection air lift assembly, which pumps the gravity-settled suspended solids from the mixed liquor at a selectable pre-determined rate of approximately four times the system design flow back into the first anoxic chamber 116 through the conduit 148 (shown in FIG. 6). The third port 148, formed through the second partition wall 150, allows for the selective transfer of the suspended waste solids from the third chamber 128 to the first chamber 116. Preferably, a second surface scum removal system 134, utilizing another siphon-ejection air lift assembly, is provided for collecting scum from the clarifier surface and pumping this material back to the stilling well 155 at a rate of approximately one-tenth of the system design flow. A pipe wasting air from the blower assembly may be provided to direct excess air to the clarifier surface, so that air flow forces floating scum and solids toward the scum removal system 134. The return activated sludge pump assembly 142 and the scum removal pump assembly 134 may be regulated by any suitable type of valving, such as an air needle valve.

The floating scum in chamber 128 is received and collected via an inlet pipe 175, with the waste exiting into the stilling well 155 behind the baffle wall 158 at port 160, via a siphon-ejection pump 176, mounted below, and connected to, forcemain 140. The return-activated sludge is returned back into the first chamber 116 via a return activated sludge siphon-ejection pump 138 mounted below the return activated sludge forcemain 144. FIG. 6 further shows a pair of routed flexible air lines 103, 105, which preferably lead to a needle valve block 107, which is also in communication with a conduit 132 for air flow rate adjustment.

FIGS. 6 and 8 best illustrate the stilling well 155 behind the baffle wall 158 formed between wall 118 and the second chamber 122 (as best shown in FIG. 8, a stilling well inlet opening 159 is formed through the baffle wall 158). As shown in FIG. 6, an inspection and maintenance port 162 is preferably formed through the cover of the housing 112 above the stilling well chamber. Resultant purified water is selectively discharged from the outlet port 152. Preferably, a removable effluent filter 151 is provided in a filter sleeve 153 in the path of the outlet 152, thus providing tertiary effluent filtration to remove any remaining clarifier floc and/or fine, suspended solids prior to the effluent discharge. The effluent filter 151 may be formed from polyester/polyethylene/polystyrene fiber or strand foam material or the like contained within a perforated canister or the like connected to the outlet port 152. As will be described below, the system may include additional treatment, such as an in-line ultraviolet disinfection system. Further, preferably, due to the corrosive nature of the materials contained within the tank, all internal piping and associated supports are formed from plastic or similarly non-corrosive materials, with no corrosive metal fasteners or the like. The bottom plate 177, which is preferably formed from plastic or a combination of steel and plastic or the like, provides buoyancy flotation resistance.

Figure 10:
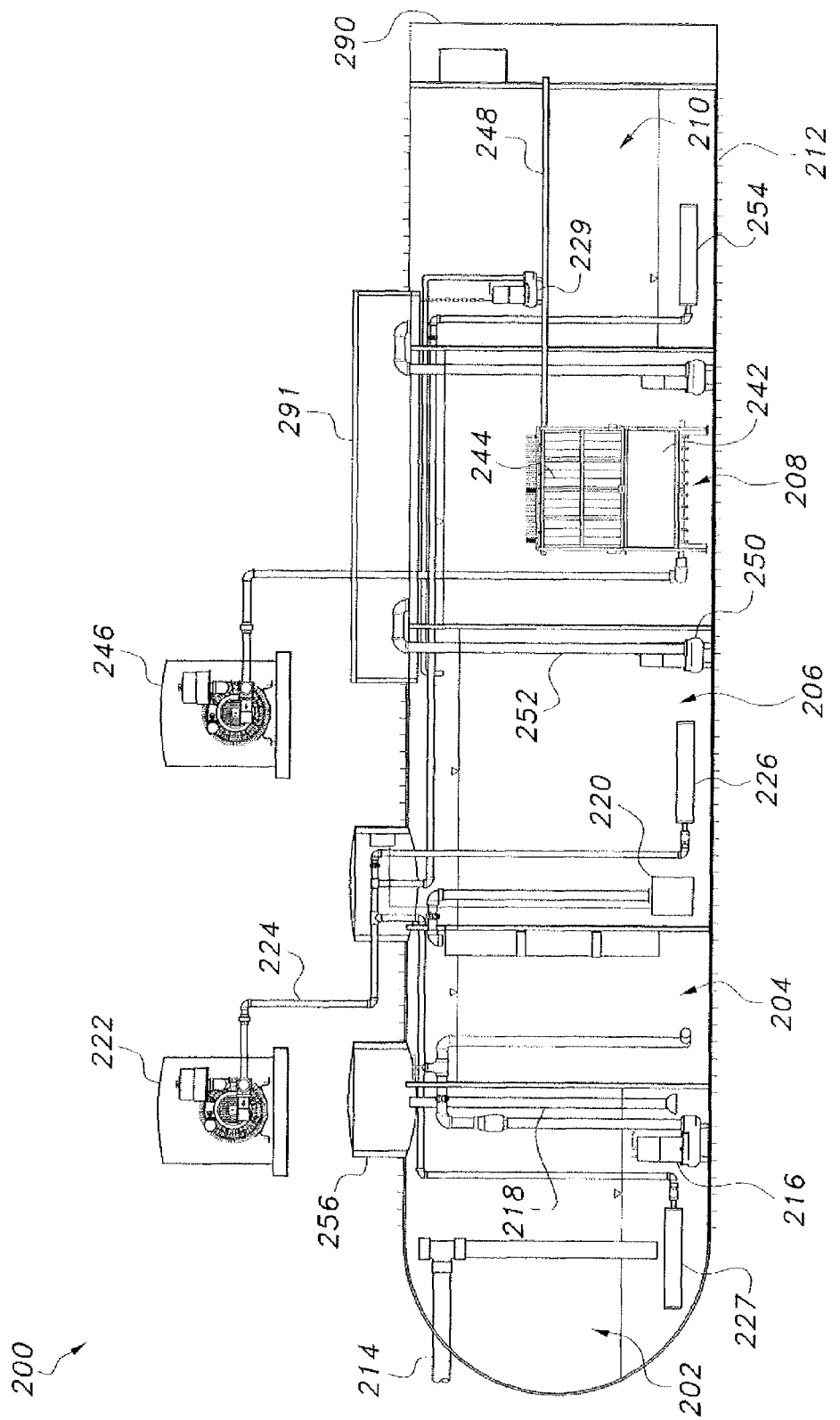
FIG. 10 is a diagrammatic side view of another alternative embodiment of a wastewater treatment system according to the present invention.
Figure 11:
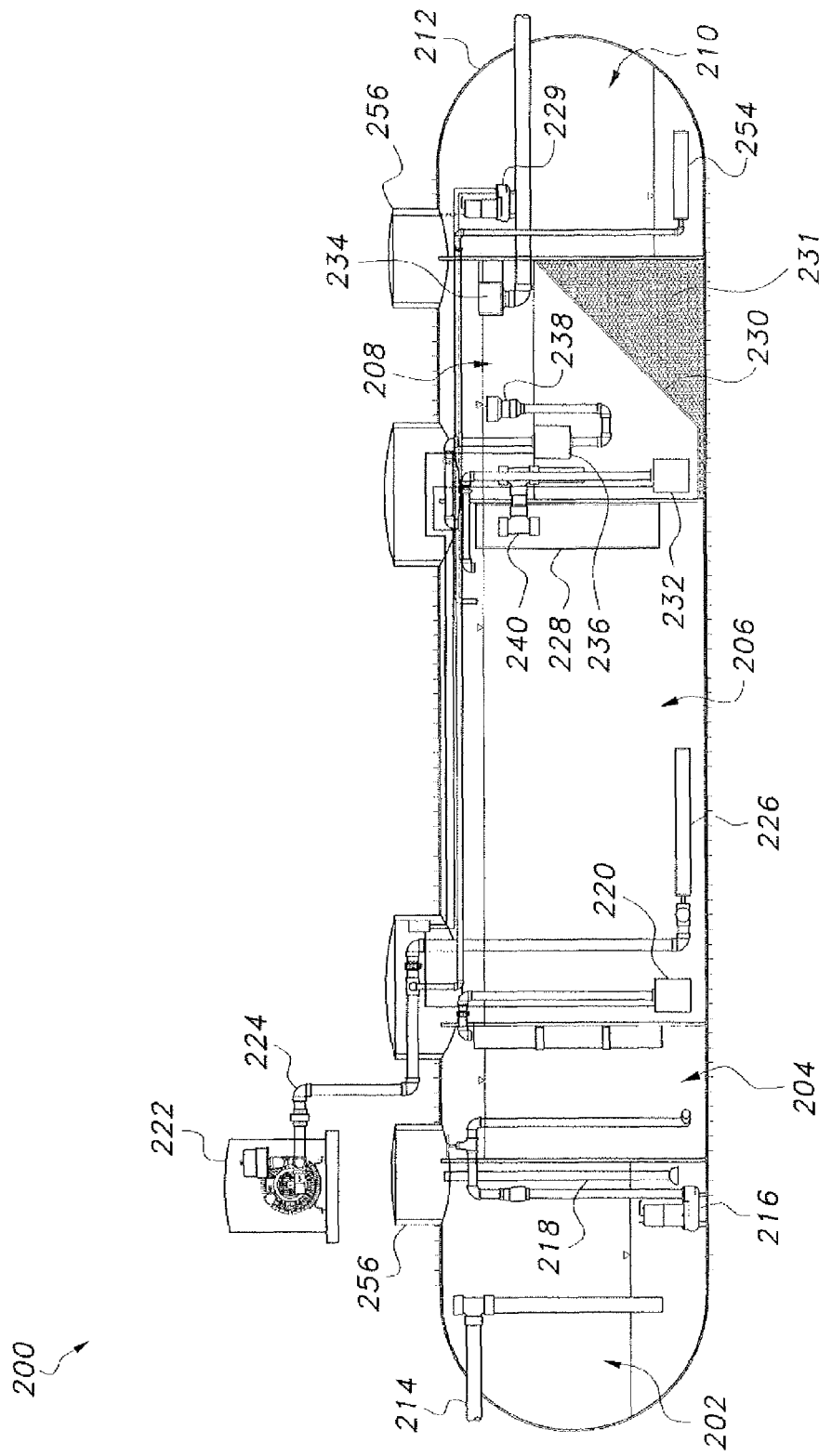
FIG. 11 is a diagrammatic side view of another alternative embodiment of a wastewater treatment system according to the present invention.

In the alternative embodiments of FIGS. 10 and 11, the system 200 utilizes a steel-reinforced plastic tank 212 placed in a horizontal position. This configuration permits construction of the treatment system 200 in larger sizes, varying from 2,000 gallons per day and larger. Horizontal tank construction can utilize steel-reinforced plastic tanks 212 having diameters of sixty inches, seventy-two inches, eighty-four inches, ninety-six inches, one hundred and eight, one hundred twenty inches, one hundred and forty four inches and larger. The horizontally placed tank 212 permits fabrication of larger wastewater treatment systems 200 having multiple treatment compartments, including, but not limited to, a flow equalization and influent pumping compartment 202, an anoxic compartment 204, a bioreactor compartment 206, a clarification compartment 208 (for effluent filtration), and a sludge digestion compartment 210.

It should be understood that in addition to the various forms of treatment described below, the system 200 may further incorporate additional conventional methods of treatment, such as, but not limited to, activated sludge/extended aeration (AS/EA), integrated fixed film activated sludge (IFAS), moving bed biological reactors (MBBRs), sequencing batch reactors (SBRs), membrane bioreactors (MBRs), trickling filters (TFs), biofilters (BFs/BAFs), or the like. Further, it should be understood that the housing may include additional compartments, which may include, but are not limited to, a chlorine contact chamber, a fat, oil and grease (FOG) separator chamber, a trickling filter chamber, a post-aeration chamber, an effluent pump station chamber and a UV-disinfection chamber.

It should be further understood that the compartments within the tank may be repurposed to facilitate other methods of treatment. For example, the anoxic compartment may be converted to an anaerobic digester through the implementation of mixers and heating exchangers. Anaerobic digestion is widely used as a renewable energy source because the process produces a methane-rich biogas suitable for energy production, thus helping to replace fossil fuels. The nutrient-rich digestate that is produced in the process can be used as fertilizer.

Using the exemplary figures given above, the 72-inch diameter horizontal steel-reinforced plastic tank 212 with an approximate overall length of thirty feet would have a treatment capacity of approximately 5,000 gallons per day. A 120-inch diameter horizontal steel-reinforced plastic tank 212 with a length of approximately forty feet would have a treatment capacity of approximately 20,000 gallons per day.

In the system 200 of FIGS. 10 and 11, wastewater enters the first compartment 202 through an inlet port 214, which, using the exemplary figures given above, may have a size range between approximately four inches and eight inches. Influent is stored temporarily therein to equalize daily flows in order to match the treatment system's average daily treatment flow. Wastewater is pumped through either a simplex or duplex pumping system utilizing a pump 216, which may be either an air lift or electric submersible pump(s), to pass to the anoxic compartment 204. Control of the pumping system is either continuous or intermittent, depending upon the type of pump and its control features. Submersible pressure transducers 218 may also be utilized to monitor and control electric pump operation. Additionally, it should be noted that compressed air from a blower assembly 222 is preferably delivered through air piping 224 to a submerged air diffuser 227 to keep unsettled solids in suspension.

After pumping from the basin of the flow equalization compartment 202, the wastewater is mixed in the anoxic compartment 204, where facultative bacteria utilize incoming carbon food sources in the wastewater stream, along with oxygen contained either in the form of dissolved oxygen or chemically bound in available nitrates, along with further nitrites to foster bacterial digestion of the incoming wastewater contaminants and nutrients. Additional recycling and mixing in the anoxic compartment 204 takes place in the form of mixed liquor suspended solids (MLSS) pumping from the bioreactor compartment 206 through the use of an MLSS pumping system 220.

Wastewater in the anoxic compartment 204 flows by gravity into the bioreactor compartment 206, where additional wastewater treatment is provided in the form of aeration. Aeration is provided by an electric compressed air blower assembly 222. The blower assembly 222 may be either a regenerative air blower or a positive displacement air pump. Compressed air from the blower assembly 222 is delivered through air piping 224 to a series of submerged air diffusers 226. The air diffusers 226 disperse air in the form of air bubbles, which rise to the water surface. The diffusers 226 can be either coarse air or fine air units, depending upon the level of required wastewater treatment.

Aeration from the blower assembly 222 transfers atmospheric oxygen into the wastewater. Aeration from the blower assembly 222 further provides mixing of the wastewater, fostering growth of the activated sludge. As in the previous embodiments, the use of a fixed film component, either in the form of a stationary plastic assembly or free-floating plastic media, fosters the formation of the attached growth microorganisms. The combined fixed film and activated sludge process promotes advanced nitrification and de-nitrification of the wastewater, and ultimately the removal of nitrogen contaminants.

The MESS pumping assembly 220 may utilize either an air-lift pump or submerged electric pumps, and may have one or more pumps implemented simultaneously. The MLSS pump assembly 220 preferably pumps mixed liquor to the anoxic compartment 206 at a rate of approximately four times the treatment system design flow, although this rate can be variable and adjusted to meet treatment system requirements. After treatment in the bioreactor compartment 206, wastewater flows by gravity through a stilling well assembly 228, shown in FIG. 11.

In the embodiment of FIG. 11, the stilling well assembly 228 reduces, by gravity, the amount of mixed liquor suspended solids that will discharge from the bioreactor compartment 206. Wastewater then enters the clarification compartment 208, by way of a plastic down pipe assembly 240, where the mixed liquor suspended solids will settle, by gravity, to the bottom of a sloped sump assembly 230. The sloped sump assembly 230 is preferably formed using plastic sheet materials that create a tetrahedral assembly that directs settled solids to the bottom of the clarifier chamber 208. The void space between the sloped sump assembly 230 and the housing 212 is preferably filled completely with a closed cell urethane foam 231 or the like.

A return activated sludge pump assembly 232 then pumps the settled solids or biomass back to the bioreactor compartment 206 for additional treatment. After settling of the solids, the clarified wastewater or effluent gravity flows up and through an effluent discharge weir 234. The discharge weir 234 is preferably fabricated from plastic and has an adjustable saw tooth weir gate that can be calibrated to permit consistent effluent discharge from the clarifier compartment 208. Additionally, the clarifier compartment 208 is equipped with a surface scum removal assembly 236 that will remove floating scum and solids from the clarifier water surface. The scum removal assembly 236 includes a plastic scum intake port 238 connected by plastic piping to an air-lift pump. The scum removal assembly pumps the scum back to the bioreactor compartment 206 for additional treatment.

In the embodiment of FIG. 10, a membrane filter assembly 242 (or, alternatively, an effluent filter) replaces the clarifier. The membrane assembly 242 includes a manufactured membrane filter unit 244, which may utilize an elastomeric, polymeric, or ceramic membrane filter media. The membrane unit 244 is modular and can be installed in various configurations of the system 200.

The membrane unit 244 utilizes compressed air from either the bioreactor blower 222 or a dedicated membrane blower assembly 246. Compressed air from the membrane blower 246 provides additional aeration of the mixed liquor and further complements nitrification and de-nitrification. The membrane filter assembly 242 discharges effluent or permeate through a permeate discharge pipe 248, that can be discharged to the local environment or reused as reclaimed or recycled wastewater.

Control of wastewater levels in the membrane compartment 208 is implemented through the use of pressure transducer or mercury float switch assemblies connected to a master wastewater treatment plant electric control panel. A recirculation or membrane tank pump 250 is provided in the bioreactor compartment 206. The recirculation pump 250 maintains water levels for proper membrane unit operation. The recirculation pump 250 may be configured so that its piping 252 can pump mixed liquor to the membrane compartment 208 or the sludge digester compartment 210.

The sludge digester compartment is provided for the treatment of waste mixed liquor suspended solids or waste sludge. This compartment contains a diffuser or series of diffusers 254 that provide aeration and mixing of the waste sludge. A sludge dewatering pump or supernatant pump assembly 229 may be provided so that supernatant water can be pumped from the sludge digester compartment 210 back to the bioreactor compartment 206. The pump assembly 229 is similar to pump assembly 216 and may hang from the upper wall by a chain (as shown) or may be similarly supported in any suitable manner. Accumulated waste sludge in the sludge digester compartment 210 will be pumped and discharged off-site by approved methods, as is typical of the wastewater treatment process. Preferably, due to the corrosive nature of the materials contained within the tank, all internal piping is formed from plastic or similar non-corrosive materials, with no corrosive metal fasteners or the like. It should be noted that FIG. 10 illustrates an outer housing 290 adapted for partial burial applications, where the pumps and controls are secured to the bulkhead in a plastic/corrosion-resistant metal enclosure. It should be understood that the pumps and controls may, alternatively, be positioned outside of the tank, against the bulkhead, rather than being positioned within the tank.

Access to the horizontal tank wastewater treatment system 200 is provided through either circular access hatches 256, including risers (preferably formed from plastic) and removable lids (preferably formed from plastic), or through a rectangular access hatch 291 (preferably formed from corrosion-resistant metal), as described in the previous embodiments. Similarly, as in the previous embodiments, control of the horizontal tank wastewater treatment system 200 is accomplished through the use of an electronic control panel. The control panel will control influent pumping, bioreactor aeration, MLSS pumping, return activated sludge pumping, membrane aeration, recirculation pumping, sludge digester aeration, supernatant pumping, etc. The control panel preferably includes both manual and automatic switches, indicator lights, audible warning horns, visible warning lights, and an optional auto-dialer mechanism that can notify a manned station in the event of a wastewater treatment mechanical problem or report other metered data required of the particular system.

In the above embodiments, as noted previously, the size of the tanks, as well as the materials used in their construction, may be varied as needed. Systems capable of treating up to two million gallons of wastewater per day (or more) are envisioned. The tanks themselves could be manufactured off-site in manufacturing plants or on-site. At a particular work site, the steel-reinforced plastic material, or the like, which forms the tank housing, could be unspooled from spools with a mobile winder that turns the material in a manner similar to that of a corkscrew, constructing pipes (via welding) as it turns.

The pipes could then be manufactured into treatment tank units on-site, utilizing manufacturing equipment. Furthermore, the units could be butt welded, end-to-end, in the field by way of thermoplastic fuse welding techniques, or through other methods, in order to facilitate large treatment capacities.

Figure 12:
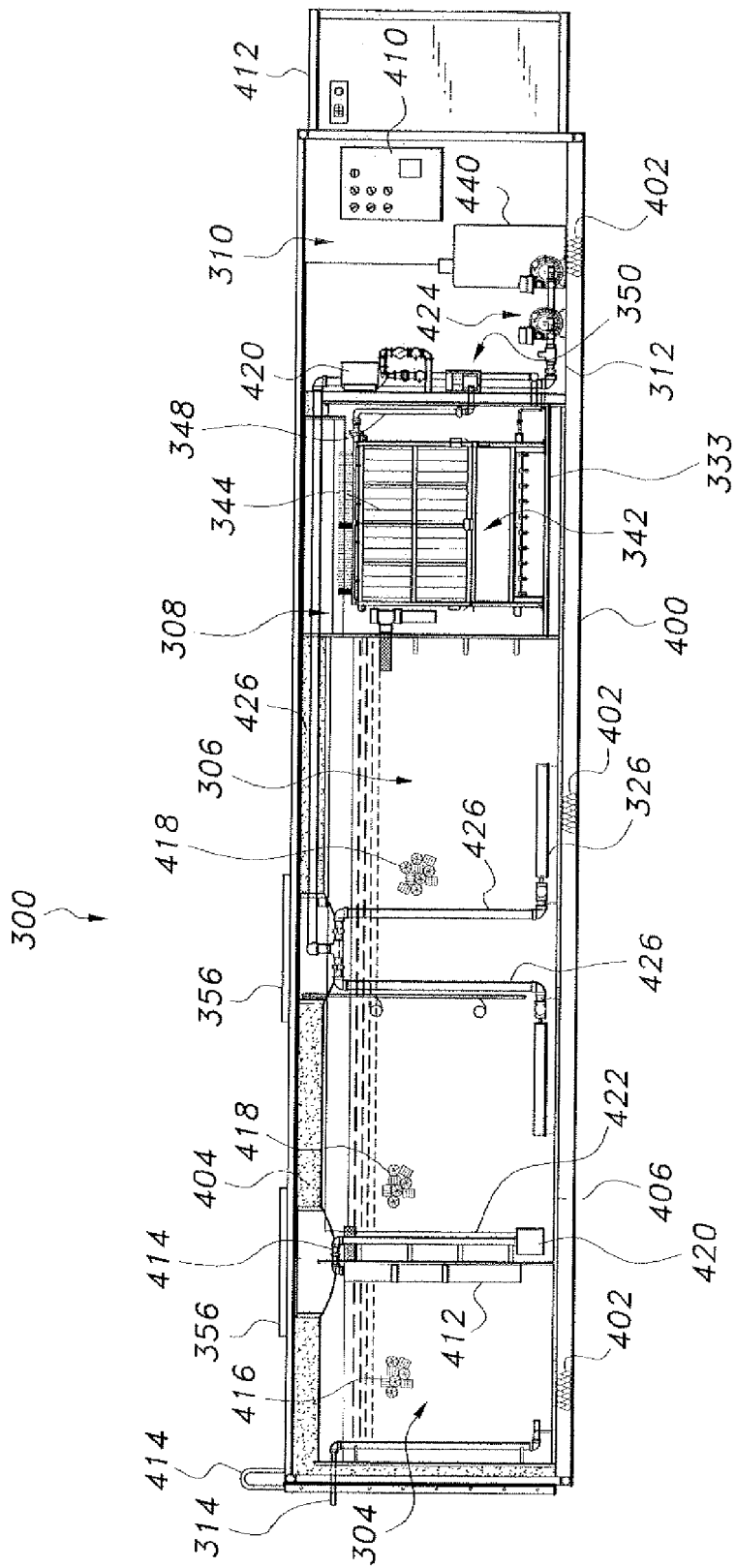
FIG. 12 is a diagrammatic side view of yet another alternative embodiment of a wastewater treatment system according to the present invention.

FIG. 12 illustrates a further alternative system 300 adapted for severe duty conditions. The system 300 includes an inner tank 312, similar to the tank 212 described above with reference to FIG. 10, mounted within an outer housing 400, which is similar to a conventional cargo or shipping container. The floor 406 of the inner tank 312 may be separated from the floor of the outer housing 400 by layers of insulation 402 or the like. The remaining space between the exterior of the inner tank 312 and the outer housing 400 may be filled with insulation 404, such as closed cell urethane foam. The system 300 is adapted for wastewater treatment operations in remote and harsh or difficult locations, such as mining camps, temporary work camps, seasonal villages and resorts, temporary or semi-temporary military bases and installations, military Forward Operating Bases (FOBS), arctic or sever cold weather operations, desert or high temperature climates, or other facilities requiring a durable, reliable and sustainable packaged wastewater treatment facility. The outer housing 400 allows the system 300 to be easily transported with minimal setup of the system. The outer housing 400 further allows the system 300 to be at least partially buried. A door 412 may be provided in the outer housing 400, allowing user access to the compartment 310. A ladder 414 may be mounted opposite the door 412, allowing easy user access to the roof of the housing 400.

The outer housing 400 may be a conventional steel shipping container or the like. Such containers may have dimensions of approximately eight feet in width, approximately 8½ feet in height and 40 feet in length, for example. The insulation 404 preferably has an R-insulation value of approximately six per one inch of foam insulation. The composite R insulation value for the entire system 300 is preferably approximately 70. The system 300 preferably has a treatment capacity of approximately 15,000 gallons per day, although it should be understood that this depends upon the strength of the influent and required effluent performance. The use of membrane filtration, as described above, may increase total treatment system capacity to approximately 20,000 gallons per day.

As in the previous embodiment, the system 300 utilizes a steel-reinforced plastic tank 312 placed in a horizontal position. The horizontally placed tank 312 permits fabrication of larger wastewater treatment systems 300 having multiple treatment compartments, including, but not limited to, a flow equalization and influent pumping compartment 302 (i.e. the pre-anoxic zone), an anoxic compartment 304, a bioreactor compartment 306, and a clarification compartment 308 (for effluent filtration). The bulkhead walls of the tank may be formed from solid sheets of high density polyethylene (HDPE) or the like, having a thickness between one and three inches, for example. Additional HDPE stiffeners may be welded to an external surface thereof (vertically and/or horizontally), as needed. Alternatively, a sheet formed from steel or the like may be sandwiched between outer layers of HDPE to form the wall of the tank. Plastic molded hemispherical ends may optionally be utilized. It should be understood that the above bulkhead options may also be applied to system 200 described above (and system 500 described below). Preferably, due to the corrosive nature of the materials contained within the tank, all internal piping is formed from plastic or similar non-corrosive materials, with no corrosive metal fasteners or the like.

In the system 300, wastewater enters the anoxic compartment 304 through an inlet port 314. The wastewater is mixed in the anoxic compartment 304, where facultative bacteria utilize incoming carbon food sources in the wastewater stream, along with oxygen contained either in the form of dissolved oxygen or chemically bound in available nitrates, along with further nitrites to foster bacterial digestion of the incoming wastewater contaminants and nutrients. Additional recycling and mixing in the anoxic compartment 304 takes place in the form of mixed liquor suspended solids (MLSS) pumping (via MLSS pump 420 through piping 422) from the bioreactor compartment 306, as in the previous embodiment. Additional mixing and treatment in the anoxic compartment 304 may be implemented through use of floating media 416; i.e., a moving bed biological reactor floating and moving through the fluid itself using a conventional submersible mixer.

Wastewater in the anoxic compartment 304 flows by gravity into the bioreactor compartment 306, where additional wastewater treatment is provided in the form of aeration. Aeration is provided by an electric compressed air blower assembly 424 or the like, as in the previous embodiment. The blower assembly 424 may be either a regenerative air blower or a positive displacement air pump. Compressed air from the blower assembly 424 is delivered through air piping 426 to at least one submerged air diffuser 326. The air diffuser 326 disperses air in the form of air bubbles, which rise to the water surface. The diffuser 326 can be either a coarse air or a fine air unit, depending upon the level of required wastewater treatment.

Aeration from the blower assembly 424 transfers atmospheric oxygen into the wastewater. Aeration from the blower assembly 424 further provides mixing of the wastewater, fostering growth of the activated sludge. As in the previous embodiments, the use of a fixed film component, either in the form of a stationary plastic assembly or free-floating plastic media (shown in FIG. 12 as floating media 416, 418), fosters the formation of the attached growth microorganisms. The combined fixed film and activated sludge process promotes advanced nitrification and de-nitrification of the wastewater, and ultimately the removal of nitrogen contaminants.

The MLSS pumping assembly 420 may utilize either an air-lift pump or submerged electric pumps, and may have one or more pumps implemented simultaneously. After treatment in the bioreactor compartment 306, wastewater flows by gravity through a stilling well assembly, as in the previous embodiment. As in the previous embodiment, the stilling well assembly reduces, by gravity, the amount of mixed liquor suspended solids that will discharge from the bioreactor compartment 306. Wastewater then enters the clarification compartment 308, where the mixed liquor suspended solids will settle, by gravity, to the bottom of a sump assembly, which is preferably sloped, as seen in the previous embodiment. The sloped sump assembly directs settled solids to the bottom of the clarifier chamber 308.

A return activated sludge pump assembly then pumps the settled solids back to the bioreactor compartment 306 for additional treatment, as described above with reference to the previous embodiment. The clarified wastewater or effluent gravity flows up and through an effluent discharge weir and out of the clarifier compartment 308. The clarifier compartment 308 is preferably equipped with a surface scum removal assembly that will remove floating scum and solids from the clarifier water surface, as described above with reference to the previous embodiments.

A membrane filter assembly 342 (or, alternatively, an effluent filter) is used as the clarifier. In FIG. 12, the membrane filter assembly 342 is shown as being raised on a platform 333 (preferably formed from plastic). The membrane assembly 342 includes a manufactured membrane filter unit 344, which may utilize an elastomeric, polymeric, or ceramic membrane filter media. The membrane unit 344 is modular and can be installed in various configurations of the system 300.

The membrane unit 344 uses compressed air from either the bioreactor blower 424 or a separate dedicated membrane blower assembly. Compressed air from the membrane blower 424 provides additional aeration of the mixed liquor and further complements nitrification and de-nitrification. The membrane filter assembly 342 discharges effluent or permeate through a permeate discharge pipe 348 and then through an inline ultraviolet light disinfection system 350. The effluent or permeate can be discharged to a storage tank, which may then be emptied into the local environment or reused as reclaimed or recycled wastewater. The treatment system may include a soda ash feed system 440 to adjust pH or additional treating agents. Preferably, due to the corrosive nature of the materials contained within the tank, all internal piping and associated supports are formed from plastic or similar non-corrosive materials, with no corrosive metal fasteners or the like. Additionally, a final effluent filter may be used prior to pumping through the outlet port. Any suitable type of effluent filter may be used, such as a pervious concrete manhole-type plate lined with a 20-micron filter sock, a drum filter or the like. Additionally, phosphorous may be removed biologically, if required, by binding the phosphorous to the microorganisms' cellular structures and, subsequently, wasting the phosphorous as part of the wasted sludge.

Access to the horizontal tank wastewater treatment system 300 is provided through either circular access hatches 356, including risers and removable lids, as described in the previous embodiments, or through a doorway 412. Similarly, as in the previous embodiments and as noted above, control of the horizontal tank wastewater treatment system 300 is accomplished through the use of an electronic control panel 410. The control panel will control influent pumping, bioreactor aeration, MLSS pumping, return activated sludge pumping, membrane aeration, recirculation pumping, and sludge digester aeration. The control panel 410 preferably includes both manual and automatic switches, indicator lights, audible warning horns, visible warning lights, and an optional auto-dialer mechanism that can notify a manned station in the event of a wastewater treatment mechanical problem or report other metered data required of the particular system. It should be noted that the control panel and blowers may be secured to the top of the outer housing 400 as opposed to being positioned within a separate equipment room 310, as illustrated.

Figure 13:
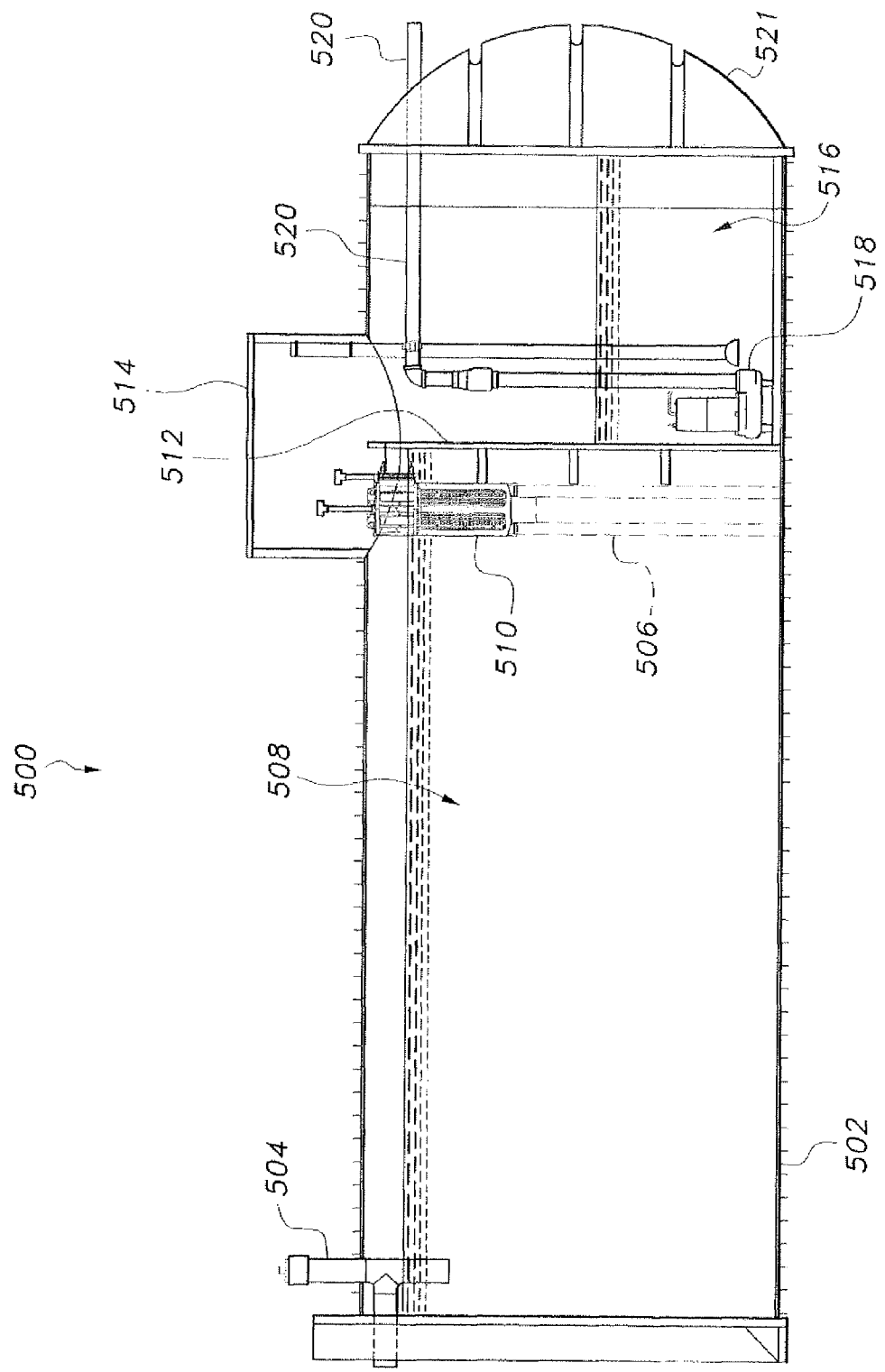
FIG. 13 is a diagrammatic side view of still another alternative embodiment of a wastewater treatment system according to the present invention.

FIG. 13 illustrates a further treatment system 500 including a housing 502, which is preferably configured similarly to a conventional septic tank. An inlet port 504 with a downpipe assembly is provided for feeding solid waste into a solids tank 508, as in a conventional septic tank system. Preferably, the solids tank 508 includes biological treatment, as described above with regard to the anoxic treatment of the previous embodiments. The solids tank 508 is preferably a cylindrical, steel-reinforced plastic tank. Once treated within this region, the treated waste gravity flows through an effluent filter assembly 510 into a pump tank 516 (if pumping is required).

The effluent filter assembly 510 may be supported on vertical supports 506 and/or mounted to a baffle wall 512 (which is preferably formed from plastic) separating the solids tank 508 from the pump tank 516. Access to the effluent filter assembly 510 for repair or replacement thereof may be gained via an access hatch 514. The treated waste may then be pumped under pressure generated by the pump 518 through an outlet port 520. The system 500 collects wastewater, segregates precipitates from floating solids (i.e., sludge and scum, respectively), accumulates, consolidates and stores solids, and provides digestion of organic matter through an anaerobic treatment process. The system 500 may also be configured to serve as a grease trap (e.g., a FOG separator) in order to collect and segregate fats, oils and grease from the wastewater stream.

Figure 14:
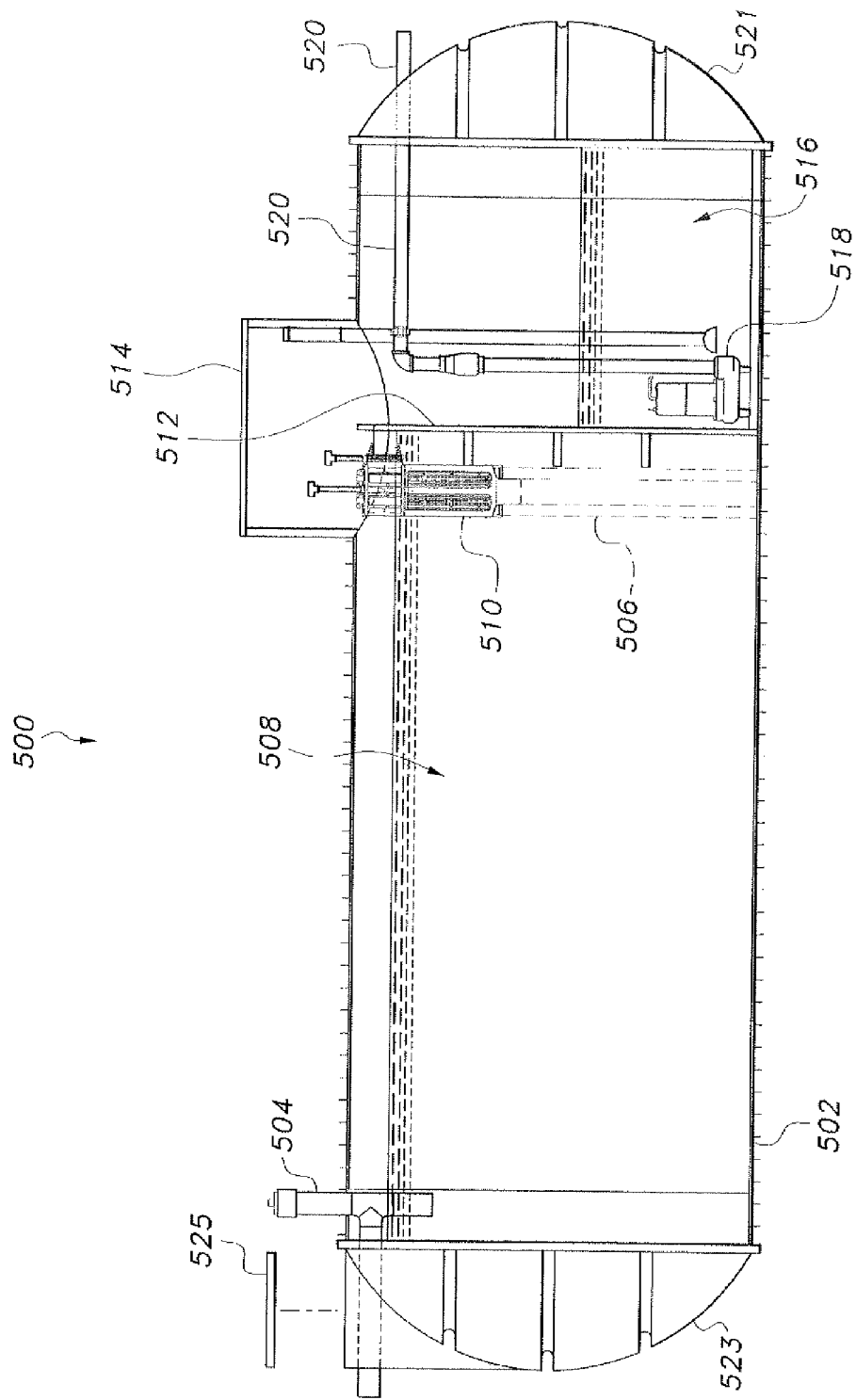
FIG. 14 is a diagrammatic side view of another alternative embodiment of a wastewater treatment system according to the present invention.

It should be understood that the overall configuration and relative dimensions of the systems 200, 300 and 500 are shown for exemplary purposes only. The hemispherical bulkhead or end 521 shown on the right-hand side of the tank (in the particular orientation of FIG. 13) could be removed, for example, or a similar hemispherical end piece 523 could be added to the left-hand side of the tank, as shown in FIG. 14. In FIG. 14, an access hatch 525 has also been added. It should be further understood that additional elements, such as access hatches or the like, may also he incorporated into the end pieces. Such tanks may be manufactured individually, and the individual tanks may be connected in the field in series to form larger tanks or a chain of tanks through electro-thermoplastic fuse welding or the like. As an example, a pair of housings 212 could be manufactured individually, each housing 212 being approximately forty feet in length. The pair would then be delivered to a site and the two could be spliced together to form a tank having a length of eighty feet. Such in-field fusing is known in the art of conveyance pipes and the like.

The steel-reinforced plastic material (which may be steel-reinforced polyethylene, polypropylene, carbon reinforced thermoplastic, or other suitable plastics) used in the tankage affords the wastewater treatment systems described above with relatively long service lives, given the corrosion-resistant nature of the material, as well as providing a means for burying the systems, thus providing overall protection from damage. The tankage and plastic internal components have an estimated service life of approximately seventy-five years. The use of such a pre-assembled, portable, steel-reinforced system provides increased flexibility in the overall design, construction and operation of civil infrastructure projects.

Figure 15:
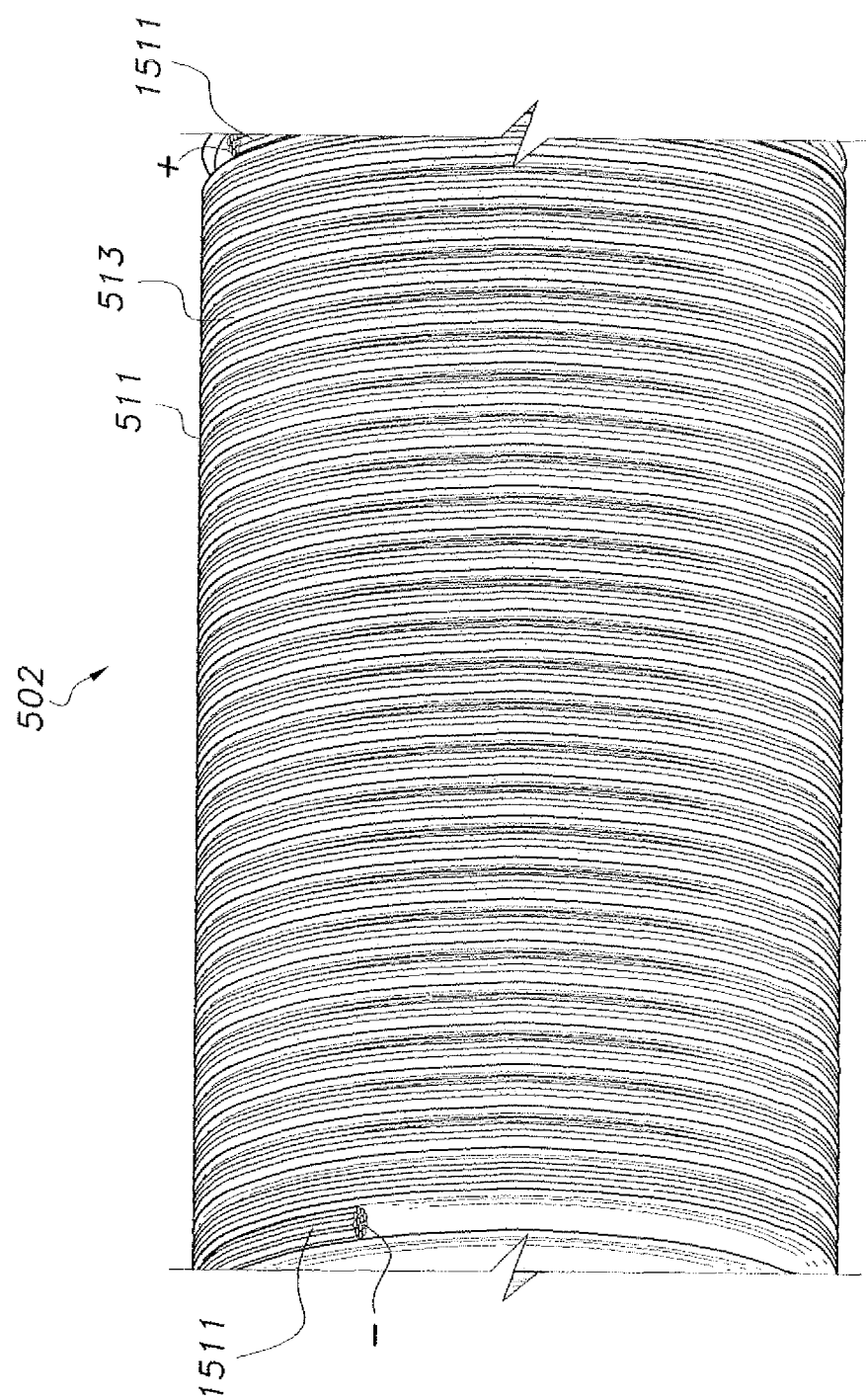
FIG. 15 is a partial side view of a housing for a wastewater treatment system according to the present invention.
Figure 16:
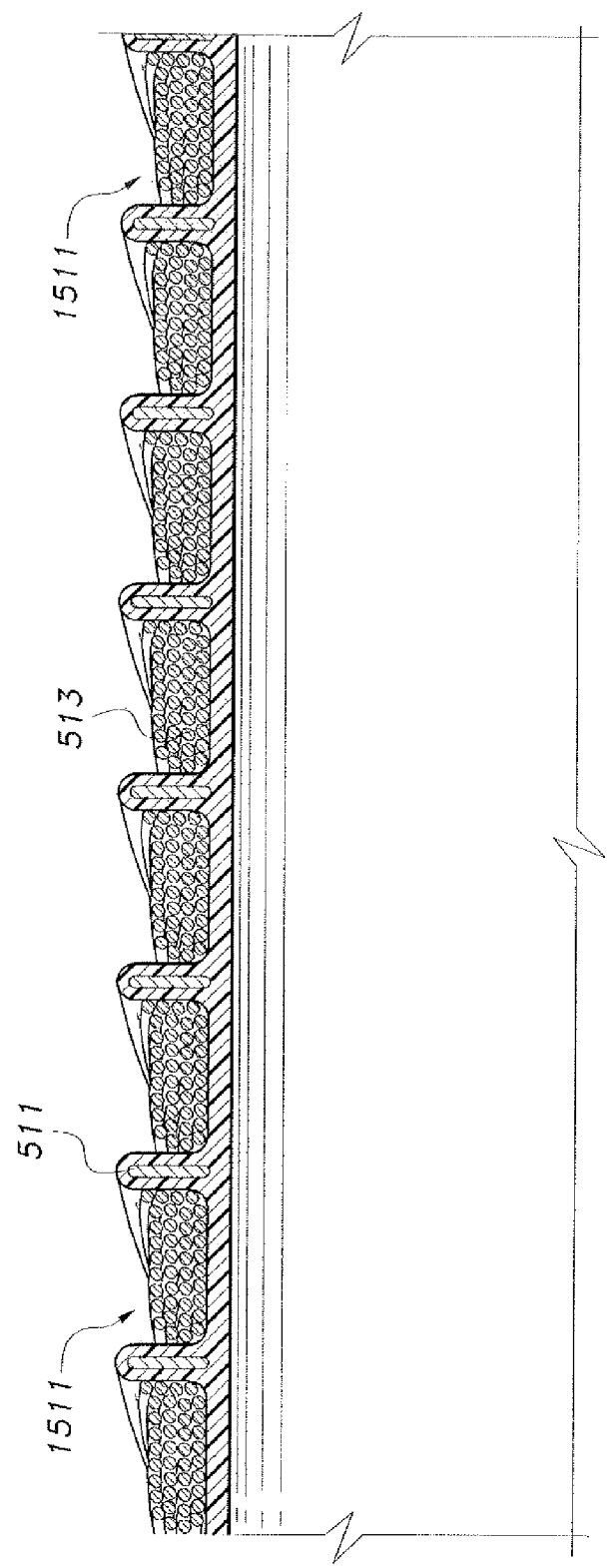
FIG. 16 is a partial side view in section of the housing of FIG. 15.

As noted above, Contech Construction Products, Inc.® of West Chester, Ohio manufactures a steel-reinforced polyethylene (SRPE) piping having a steel exterior spiral-ribbed banding that is encapsulated with a high-density polyethylene plastic, sold under the name DuroMaxx™. FIG. 15 illustrates a partial view of the housing 502, showing the spiral or helically-wound ribs 511 that are encapsulated within the high-density polyethylene plastic shell 513. FIG. 16 is a section view of the wall of housing 502, showing the steel reinforcement ribs 511 embedded within plastic 513.

Figure 17:
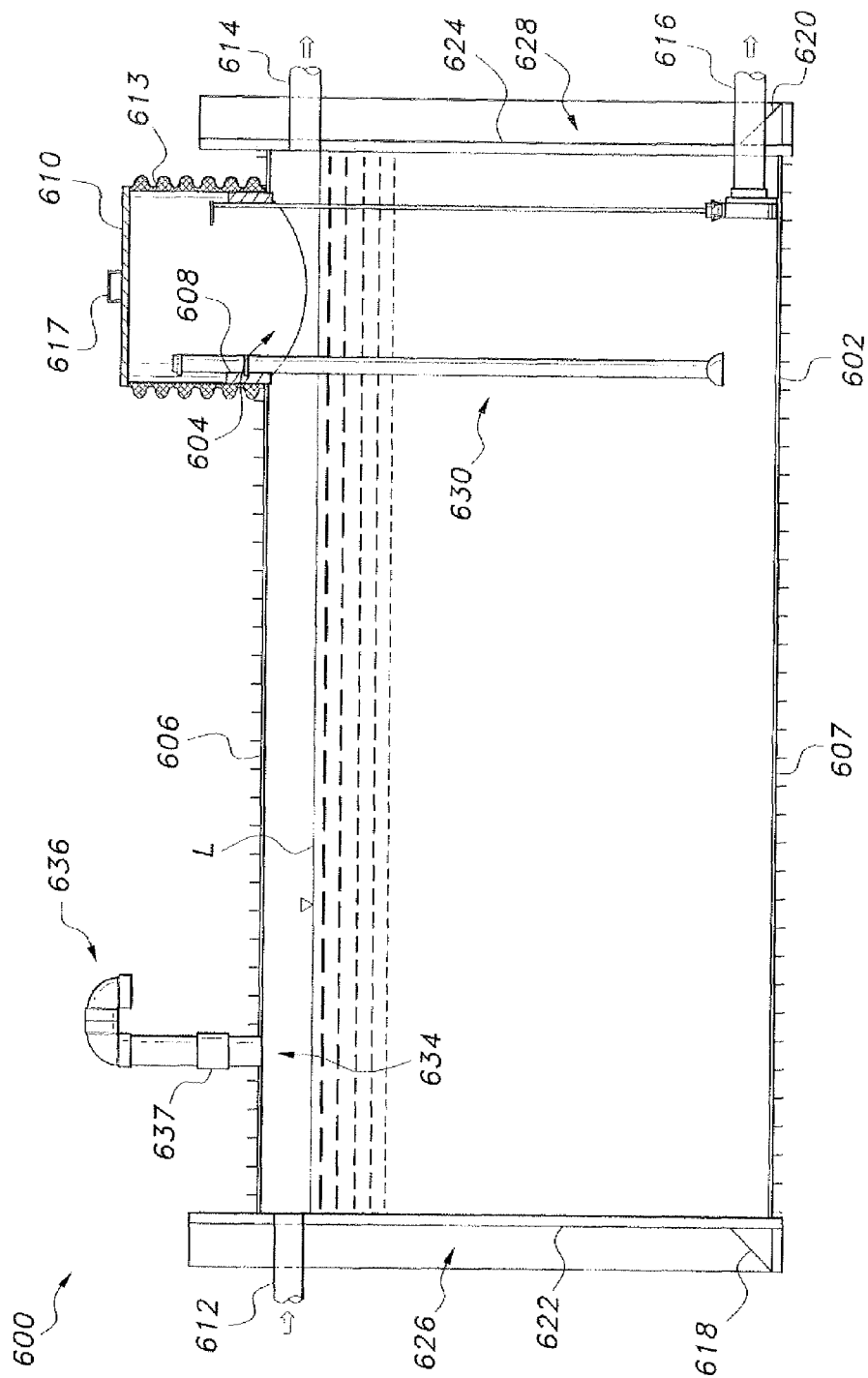
FIG. 17 is a diagrammatic side view of an alternative embodiment of a water storage tank for a wastewater treatment system according to the present invention.
Figure 18:
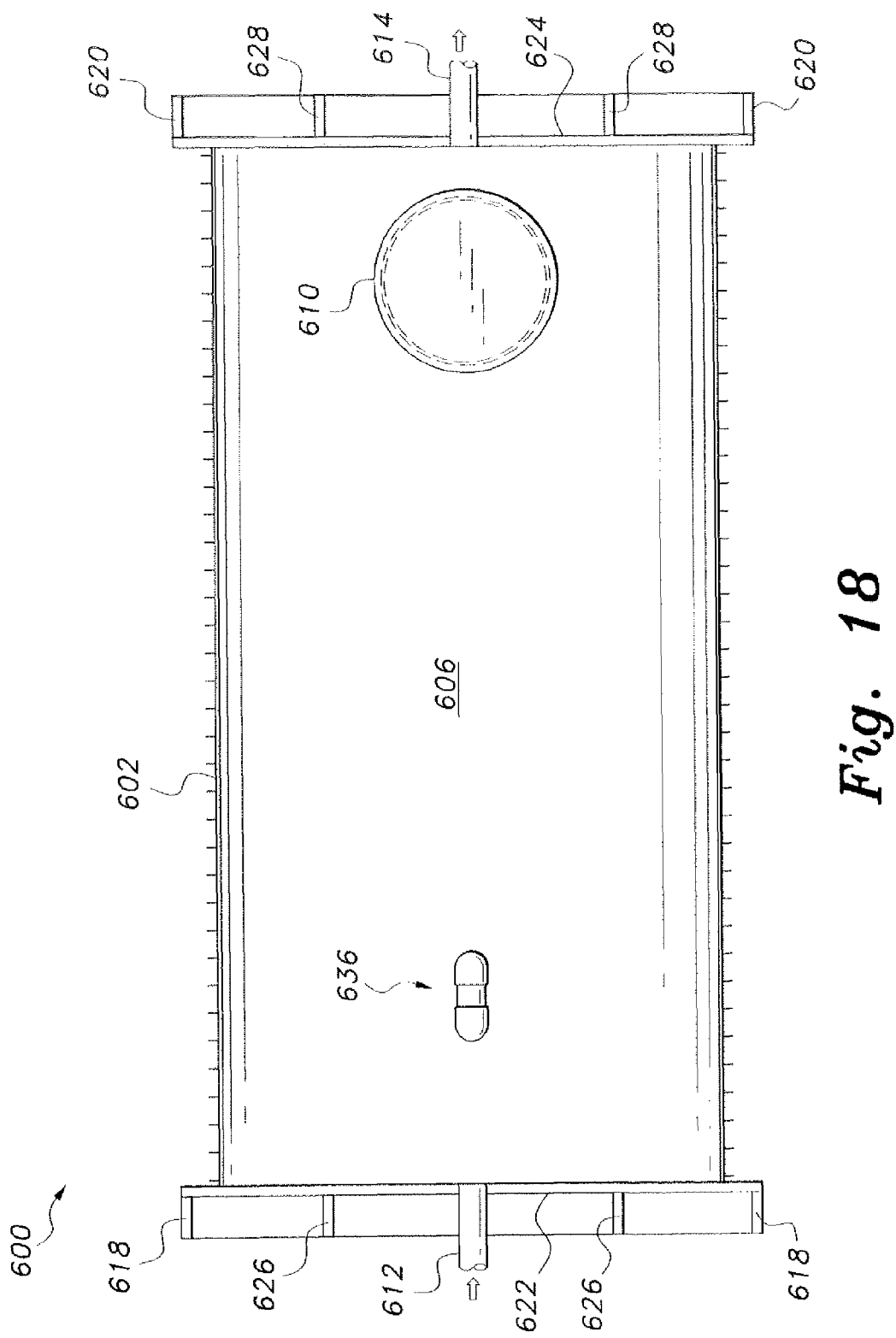
FIG. 18 is a top view of the water storage tank of FIG. 17.
Figure 19:
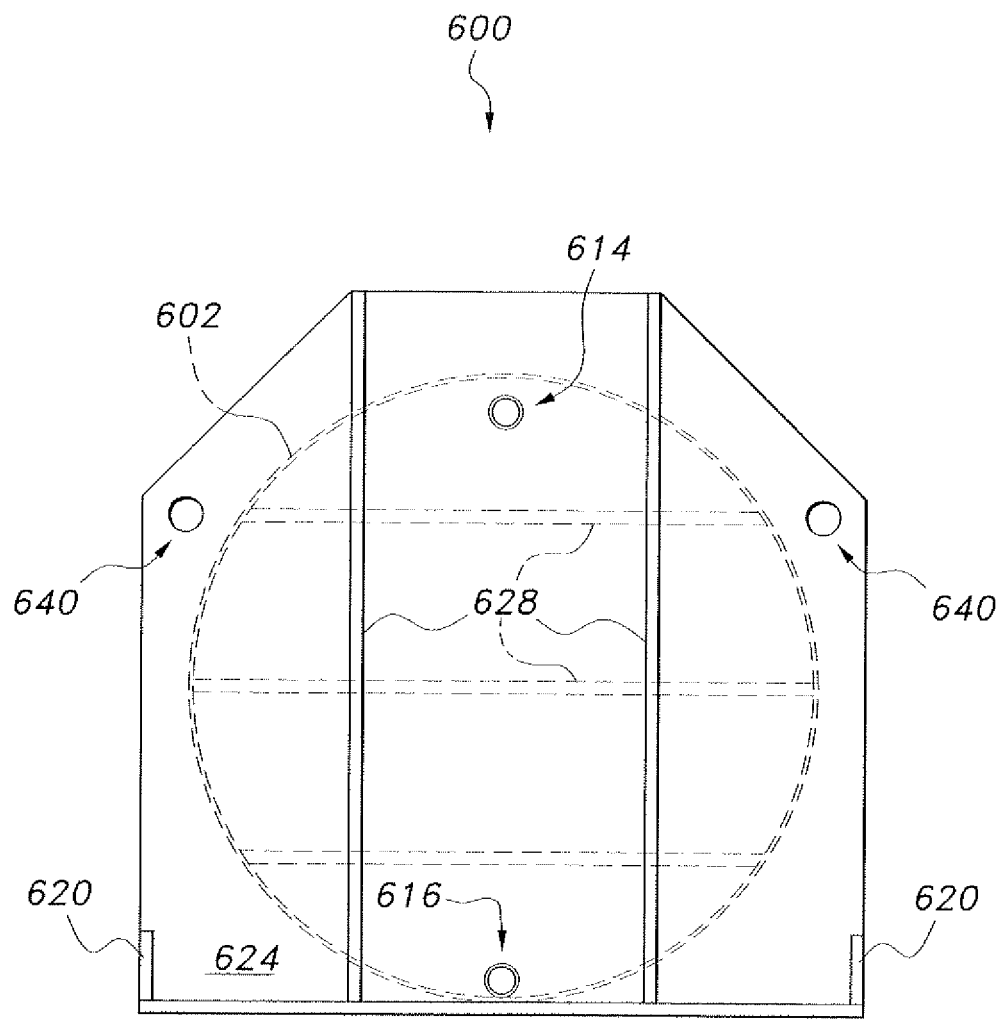
FIG. 19 is an end view of the water storage tank of FIG. 17.
Figure 20:
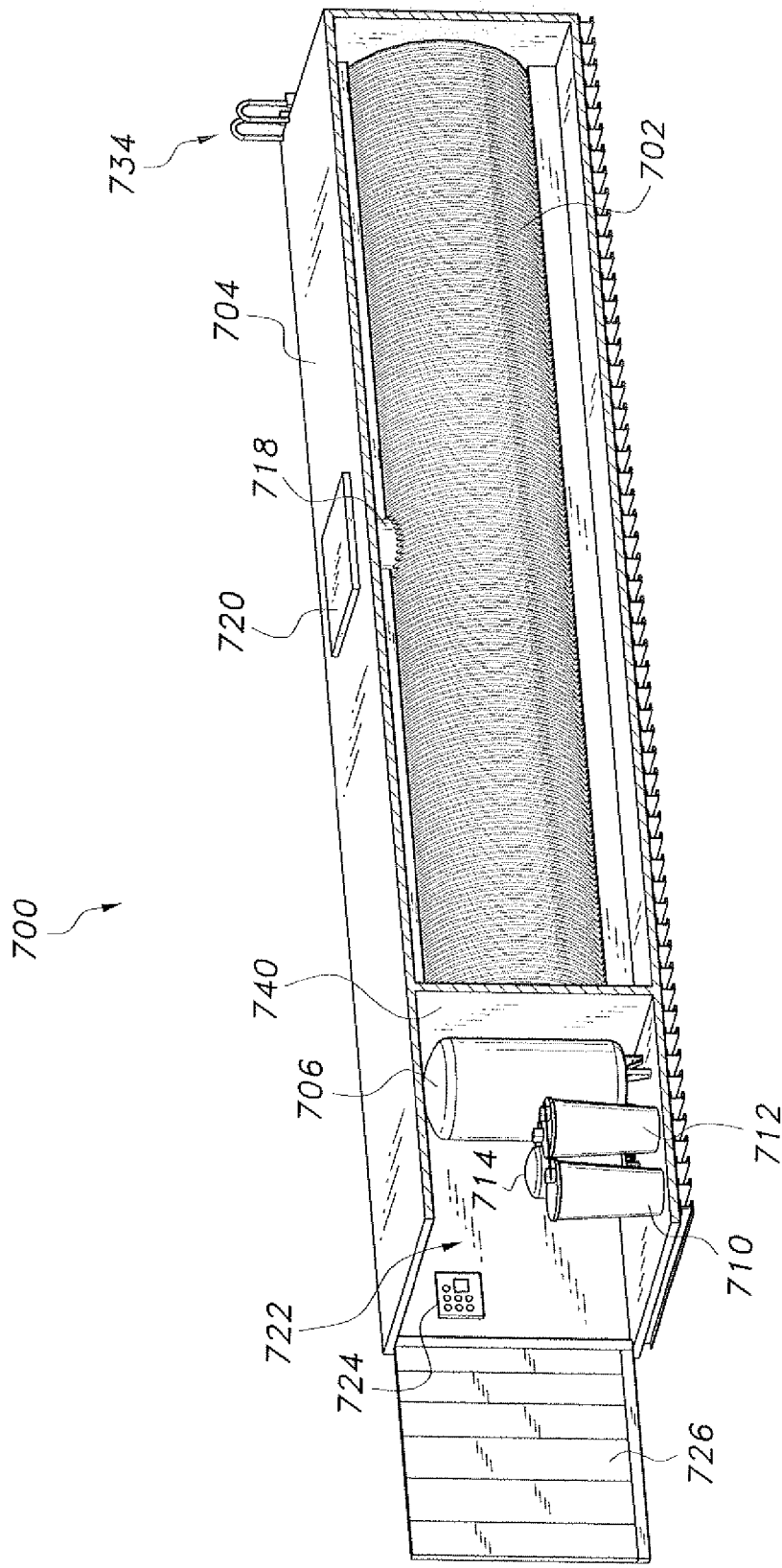
FIG. 20 is a perspective view in section of a water treatment and storage system according to the present invention, the door to the equipment room being open.

FIGS. 17, 18 and 19 illustrate an alternative embodiment of a water storage tank 600, which is similar to the septic tanks described above with reference to FIGS. 13 and 14. The water storage tank 600 includes a housing 602, which is preferably cylindrical and is preferably formed from steel-reinforced polyethylene (SRPE) piping having a steel exterior spiral-ribbed banding that is encapsulated with a high-density polyethylene plastic, such as that sold under the name Duro-Maxx™, shown in FIGS. 15 and 16 and described further above. It should be understood that the banding may have any suitable type of cross-sectional contour, such as a planar band, a substantially V-shaped band, a substantially U-shaped band or the like.

Storage tank 600 is particularly adapted for burial in the ground. Beginning with a length of DuroMaxx™ pipe (forming housing 602), the storage tank 600 is constructed by securing a pair of bulkheads 622, 624 to either end (as best shown in FIG. 17). Bulkheads 622, 624 may be secured to either end by any suitable method, such as fuse welding, and the bulkheads 622, 624 are preferably formed from high density polyethylene (HDPE) plating, steel reinforced plastic, compression molded plastic, injection molded plastic, or rotationally molded hemispherical plastic, such as those shown in FIGS. 13 and 14 for use with system 500. As in the previous embodiments, the storage tank 600 may be sized and shaped according to the particular storage needs of the user. Preferably, the housing 602 is substantially cylindrical, and the tank 600 is preferably adapted for storing approximately 22,000 gallons of water or other fluid in a single shop-fabricated unit, or may accommodate larger volumes by utilizing thermoplastic fuse welding techniques in the field.

An access port 604 is preferably formed through an upper end 606 of the housing 602. A secured access hatch 610 removably covers the access port 604, the access hatch 610 preferably being raised from the upper end 606 by a riser 608, which is preferably also formed from HDPE or the like. Access hatch 610 is also preferably formed from HDPE. When the tank 600 is buried in the ground, the access hatch 610 is preferably positioned flush, or nearly flush, with ground level.

Figure 29A:
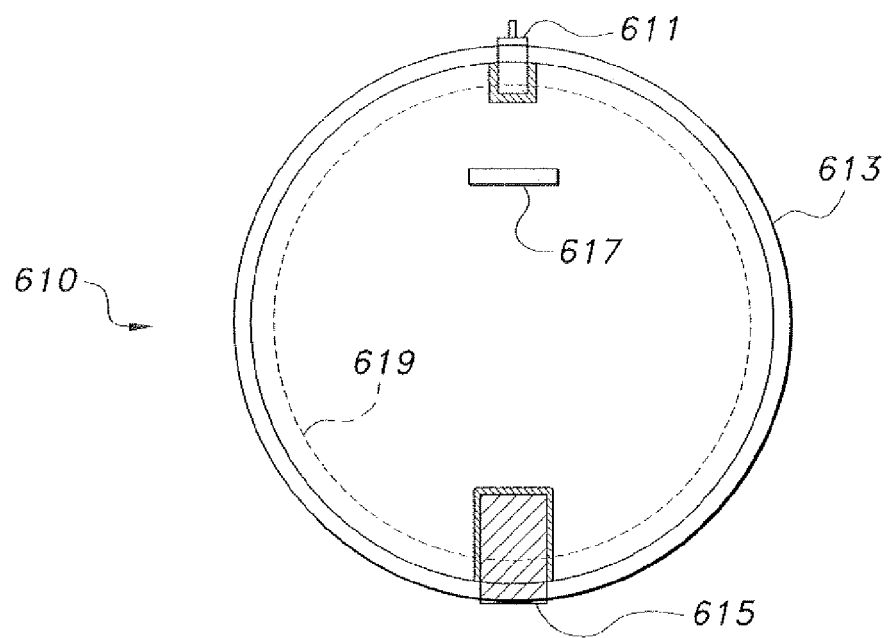
FIG. 29A is a plan view of an access hatch of the water storage tank of FIG. 24.
Figure 29B:
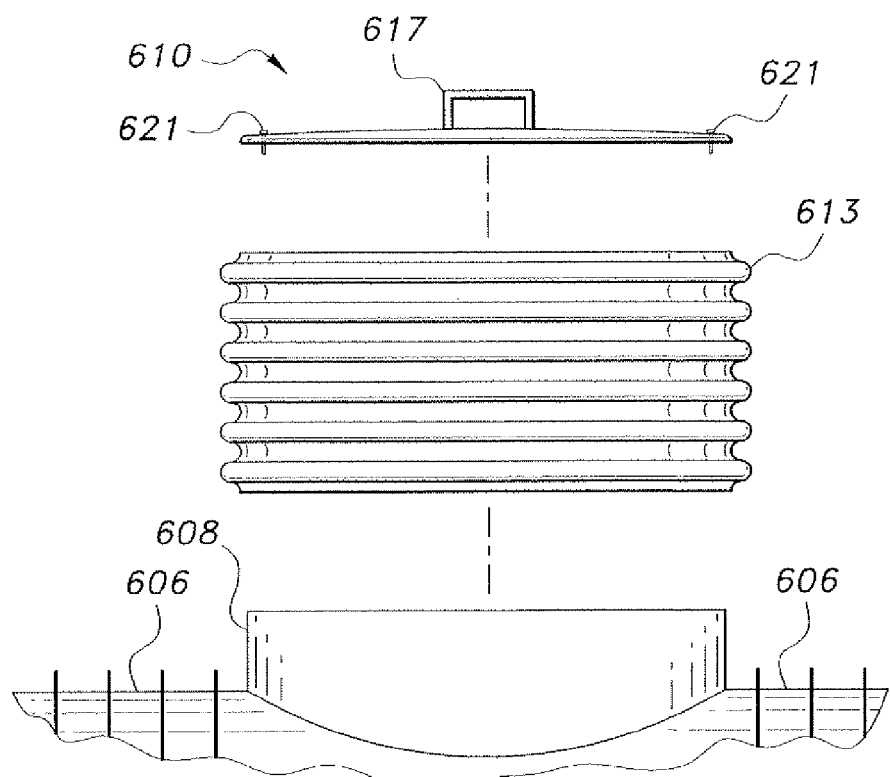
FIG. 29B is an exploded front view of the access hatch and riser of the water storage tank of FIG. 24.
Figure 29C:
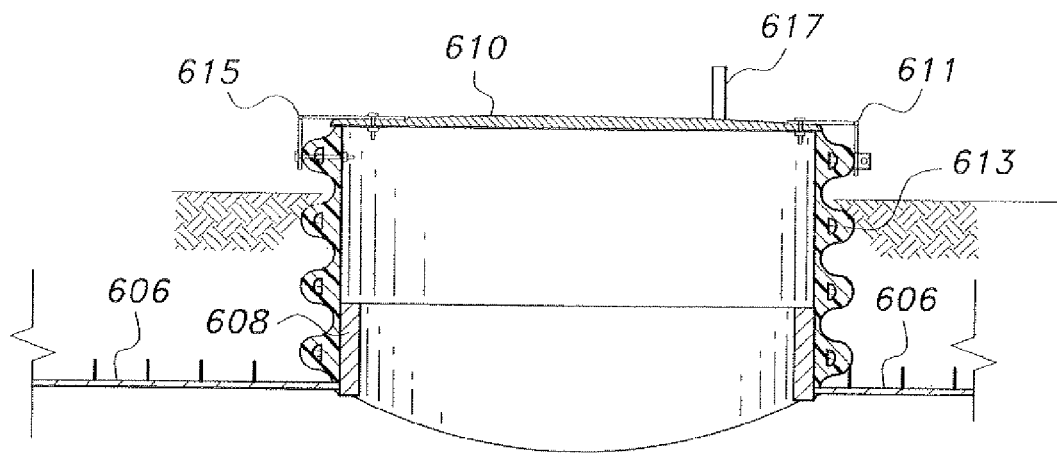
FIG. 29C is a front view in section of the access hatch and riser of the water storage tank of FIG. 24.

FIGS. 29A, 29B and 29C illustrate the access hatch 610 and riser 608. As best shown in FIG. 29A, the access hatch 610 includes a locking member 611, which may be a lockable, stainless steel butt hinge with a hasp or the like. This allows access hatch 610 to be locked against the riser 608 or a riser extension 613 (illustrated in FIG. 29C). The access hatch 610 is pivotally joined to the riser 608 or the extension 613 at its other end by a hinge member 615, which may be a stainless steel wide throw butt hinge or the like. Additionally, a handle member 617 is preferably provided on the upper surface of hatch 610 for grasping by the user.

As shown in FIG. 29C, and as noted above, a riser extension 613 may be provided, the riser extension 613 fitting about the riser 608 to increase the height of the entryway. The access hatch 610 may be secured to the upper end of the riser 608 by a hinged assembly, as described above, or, alternatively, by a direct screw set 621, as illustrated in FIG. 29B. The access hatch 610 preferably further includes a foam gasket seal 619 around the perimeter, providing a watertight seal with the riser extension 613.

Preferably, the riser 608 is formed from a solid wall SDR32.5 HDPE pipe section, which may be fuse welded to the upper end of the tank 606, the riser 608 having a height of approximately six inches (extending above upper end 606). The riser extension 613 may be formed from an AASHTO M294 double wall corrugated HDPE pipe section. The joint between the sections of pipe may be either fuse welded or sealed with a factory approved sealant.

An inlet pipe 612 projects through the bulkhead 622 for feeding water or any other desired fluid into the housing 602. It should be understood that the inlet pipe 612 is in fluid connection with any suitable type of pump or the like for feeding the fluid into the housing 602. Similarly, an outlet pipe 616 is formed through the opposite bulkhead 624 for draining fluid from the tank 600. Preferably, the inlet pipe 612 is positioned adjacent the upper end 606, and the outlet pipe 616 is positioned adjacent the lower end 607, allowing the fluid from within the tank 600 to be drained by gravity by an internal or external valve assembly. It should be understood that the outlet pipe 616 may also be in fluid communication with any desired external pump or the like. Additionally, an overflow outlet pipe 614 preferably projects through the bulkhead 624 adjacent the upper end 606, the overflow outlet pipe 614 being positioned just above the desired water level L, as shown in FIG. 17. It should be understood that the positioning and relative dimensions of the inlet pipe 612, the outlet pipe 616 and the overflow outlet pipe 614 may vary, depending upon the particular needs of the user.

As best seen in FIG. 18, the bulkhead 622 may have end gusset plates 618 mounted thereon and extending outwardly therefrom, providing stability and field leveling, and may further have stiffener plates 626 also mounted thereon and extending therefrom, as needed. Similarly, as shown in FIG. 19, the opposite bulkhead 624 may have end gusset plates 620 mounted thereon and extending outwardly therefrom, and may further have stiffener plates 628 mounted thereon and extending therefrom, as needed. It should be understood that the stiffeners 628 may be internal and/or external, and may be oriented vertically and/or horizontally. As shown in FIG. 19, each bulkhead may further have one or more eyelets 640 formed thereon, allowing the tank 600 to be easily hoisted by a crane or the like for positioning within the ground, or for removal therefrom.

Additionally, as described above with reference to the system 200 of FIGS. 10 and 11, tank the 600 may include a submersible pressure transducer 630, floats, electrodes or the like for controlling the internal or external pumping system (not shown). The submersible pressure transducer 630 or the like may also be utilized to monitor and control electric pump operation.

A vent port 634 is preferably formed through upper end 606 of tank 602, and a conduit 636 is mounted external to the housing 602 and extending upwardly therefrom. When the tank 600 is buried, the conduit 636 terminates in an open end positioned above ground level. As shown in FIG. 17, the conduit 636 is preferably formed as a gooseneck pipe, and also preferably includes a bug screen 639 to prevent infestation of tank 600.

Figure 30:
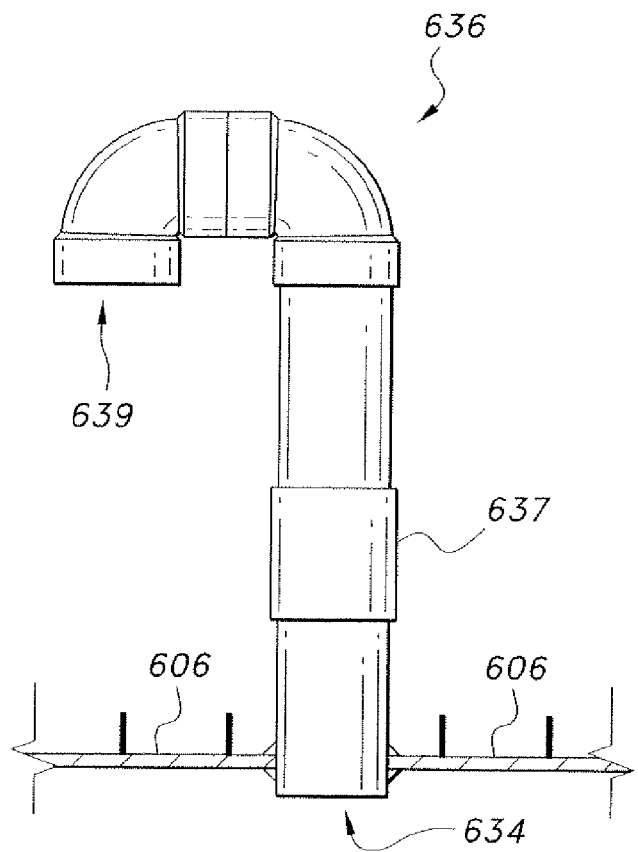
FIG. 30 is a side view of a vent conduit of the water storage tank of FIG. 24.

FIG. 30 best shows the vent conduit 636, which is formed as a gooseneck pipe and is preferably formed from a HDPE pipe section, which may be fuse welded to the upper end 606 of the tank. Preferably, the vent conduit 636 has a height of approximately six to eight inches, and may include a coupling member 637 slid thereover to permit the use of standard SCH 40 PVC pipe and fittings in the field. The coupling 637 permits easy height adjustment in the field and is easily disassembled for access, if necessary.

As noted above, the underground water storage tank 600 is preferably formed from steel-reinforced plastic, which permits the fabrication of a relatively lightweight yet rugged storage vessel. Tank 600 is easily fabricated, easily transported, and may be easily installed at the project site. The storage tank 600 has a very long service life, since the steel reinforced plastic material is corrosion-resistant and is further protected in a buried installation.

The storage tank 600 has an estimated service life of over 75 years, which is substantially longer than conventional systems fabricated from concrete, steel or fiberglass. Additionally, the installed cost, life cycle operation, and maintenance costs are substantially less than for conventional concrete, steel and fiberglass systems. Present large capacity plastic storage tanks are typically only used in above ground applications, due to the structural inadequacies of the materials. SRPE permits the direct burial of the storage tanks with the same structural integrity of concrete, steel and fiberglass. The direct burial of the SRPE tank permits greater flexibility with regard to land use, and for other purposes, while reducing concerns related to vandalism, terrorism and weather related damage.

Figure 24:
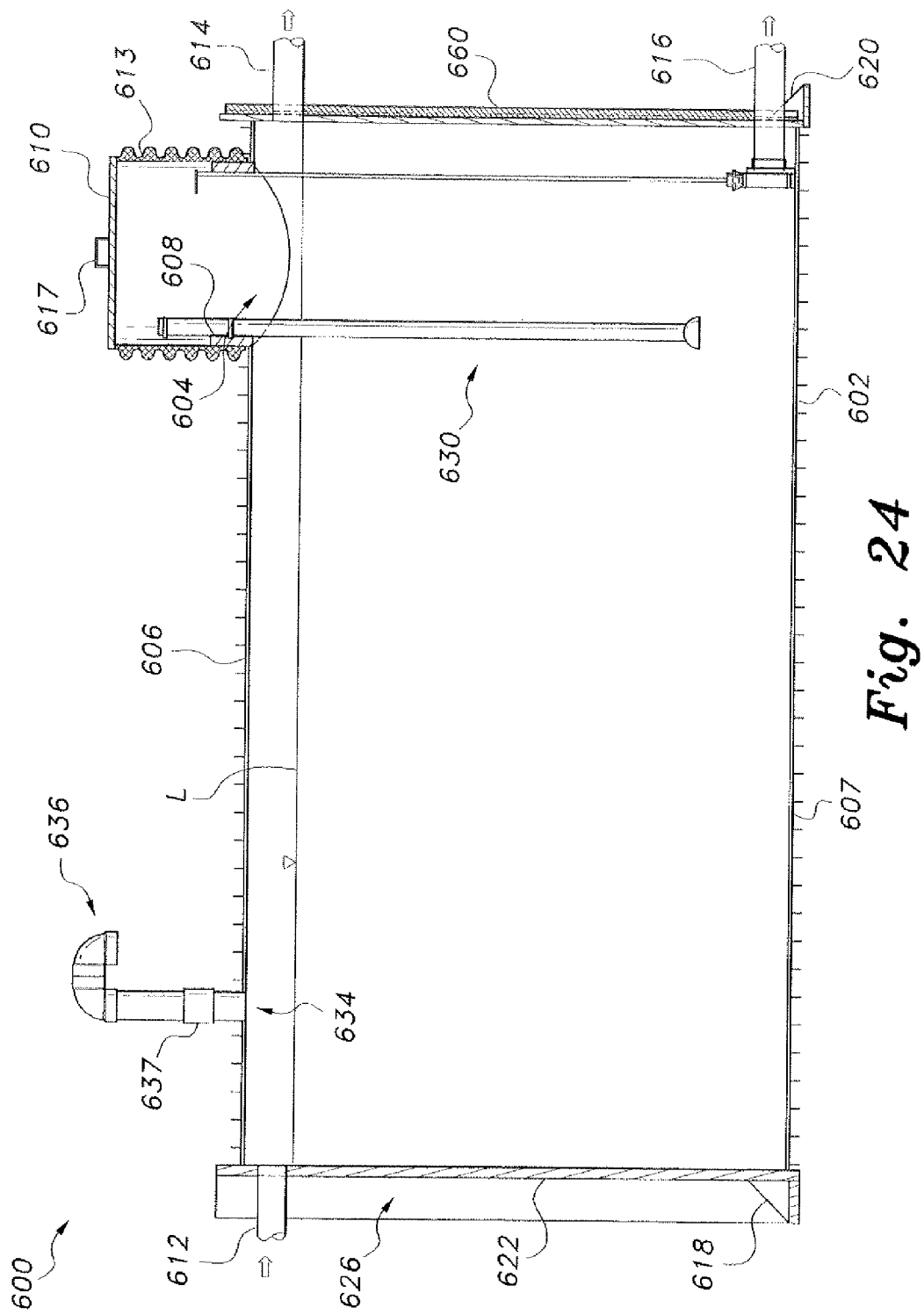
FIG. 24 is a diagrammatic side view in section of an alternative embodiment of a water storage tank for a wastewater treatment system according to the present invention.

FIG. 24 illustrates an alternative embodiment in which an SRPE stiffener bulkhead 660 is used in lieu of bulkhead 624. As best shown in FIGS. 25 and 26, the SRPE stiffener bulkhead 660 preferably includes a base plate 662 formed from high density polyethylene (HDPE) or the like, and steel-reinforced polyethylene (SRPE) reinforcement strips 664 fuse-welded (shown as weld layer 668) or otherwise secured thereto.

Figure 27:
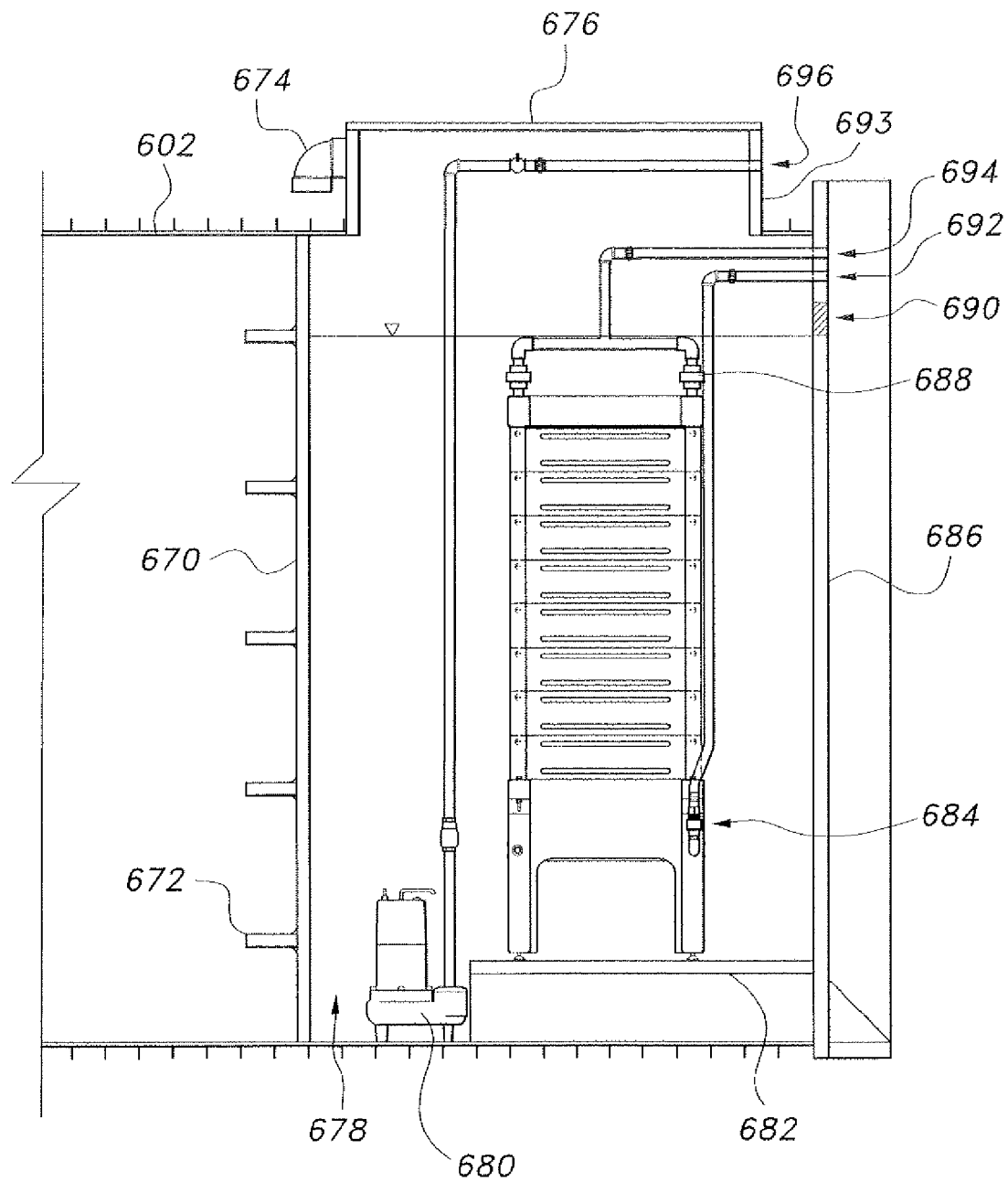
FIG. 27 is a partial, diagrammatic side view of another alternative embodiment of the water storage tank for a wastewater treatment system according to the present invention, showing details of a membrane filtration tank section.
Figure 28:
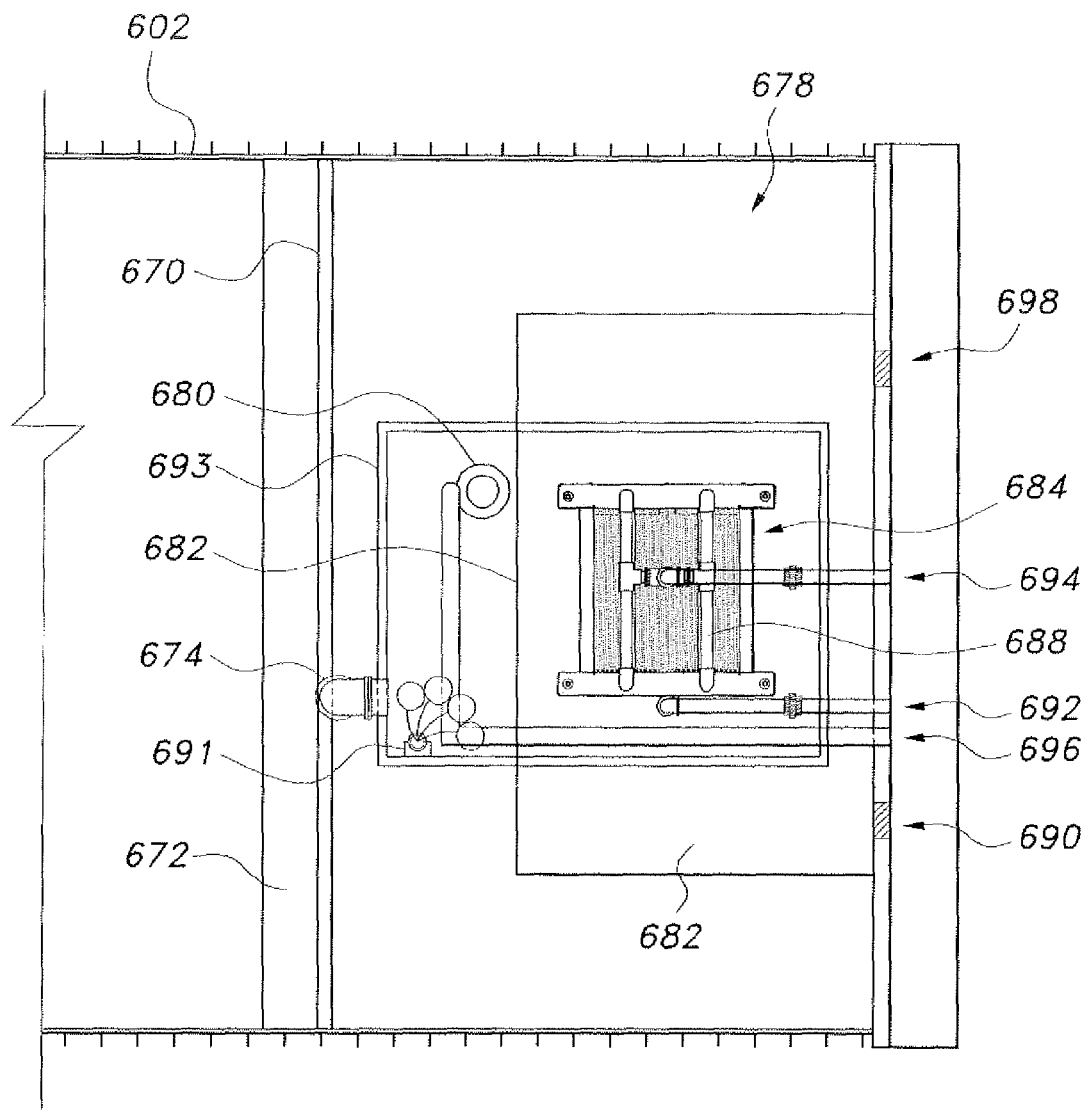
FIG. 28 is a partial, diagrammatic top view of the water storage tank of FIG. 27, showing details of the membrane filtration tank section.

Additionally, as shown in FIGS. 27 and 28, a water filtration section 678 may be added to the storage tank 600. As shown, bulkhead 624 is preferably replaced by a solid baffle wall 670, formed from high density polyethylene (HDPE) or the like, which may be reinforced with HDPE stiffeners 672 or the like. Rather than terminating at bulkhead 624, as in the embodiments of FIGS. 17 and 24, the water filtration section 678 is positioned opposite the baffle wall 670 from the storage tank 602.

A ceramic or polymeric membrane filtration system 684 is disposed within the filtration section 678. The membrane filtration system 684 preferably is seated on a raised HDPE platform 682. The membrane filtration system 684 receives water to be filtered through a raw water inlet 698 (shown in FIG. 28). It should be understood that the ceramic or polymeric membrane filtration system 684 may be replaced by any suitable type of filtration or purification system, such as a reverse osmosis filtration system or the like.

As shown, the filtration section or compartment 678 is completely separated from the storage compartment of tank 602 by a baffle wall 670. The embodiment of FIGS. 27 and 28 provides water treatment, storage and distribution capabilities utilizing a portable water treatment system. Such a system may be used in developing nations, on military missions, or for disaster relief efforts.

Raw water to be filtered is conveyed into the filtration system 684 through inlet 698, either by a gravity pipe or by an external pumping system. Gravity piping is preferred, if no mechanical pumping is required. When necessary, pumping raw water into the filtration system 684 may be implemented through the use of an external pump that is controlled by an internal water level control system 691, which may be in the form of float switches, pressure transducer controllers, or the like.

Water treatment begins with the use of the integrated ceramic, polymeric, or reverse osmosis membrane assembly 684. In the particular case of a ceramic membrane unit, raw water may be filtered using an external permeate pump that draws suction on the ceramic membrane filter face (via permeate piping 688, which leads to the external permeate pump). As is well known, this suction pressure draws water into the membrane, and then through a common membrane header manifold. The filtered water or permeate is discharged through the external permeate pump into an adjacent clean water sump or wet well, through wet well discharge piping 694.

A raw water overflow outlet 690, formed through the bulkhead 686, is further provided as a safety measure to prevent the raw water from overflowing within compartment 678. Aeration piping 692 is further provided for the conventional operation of the ceramic membrane filtration system 684.

The ceramic membrane filtration system 684 preferably occasionally backflushes automatically to clean the ceramic filter face. This filtration and backflushing cycle are necessary to sustain long term filtration operations. During the backflushing cycle, a chlorine solution helps regenerate the ceramic membranes and purge particulate that may cling to or clog the membrane pores. The chlorine solution will also provide sonic disinfection capability to the filtration system. The same chlorine cleaning system will also provide chlorine disinfection capability for the filtered water discharged to the large finished water storage tank.

As in the previous embodiments, an integrated submersible electric pump 680 may also be housed in the filtration compartment 678, which may be used to fully empty the filtration tank to purge and remove particulates and sediments that may accumulate over time. Also, as in the previous embodiments, an external integrated control panel equipped with a programmable logic controller (PLC) or the like may be provided for controlling filtration operations.

Alternatively, a polymeric membrane filter system may be used for water filtration. In this case, the raw water would flow by gravity through the polymeric membrane and into the large water storage tank 602. This form of water treatment obviously does not require a mechanical permeate pump to force water through the membrane filter face (provided that enough static head is available above the top of the membrane). Chlorine backflushing of the membrane may be utilized to occasionally clean the membrane and return the unit to normal service. A permeate pump may still be required if adequate static head is not available.

Further, a reverse osmosis water filtration system may alternatively be utilized for water filtration inside the water filtration compartment 678. In this case, the compartment 678 would remain dry and would house the reverse osmosis water filtration unit. Raw water would be pumped from a raw water source into the reverse osmosis water filtration system, where it would be filtered and then conveyed to the large water storage tank 602. It should be understood that any suitable type of filtration or purification may be utilized, such as, for example, an externally mounted green sand filter filtration system.

Similar to the previous embodiments, the compartment 678 may have an access hatch 676 formed in the upper end thereof, allowing easy access to the equipment therein for replacement and/or maintenance thereof. The hatch 676 may be raised on a riser 693, or alternatively extended, as shown. Further, an air vent 674 may be provided, which is preferably covered by an insect screen or the like.

FIGS. 20-23 illustrate a further alternative embodiment. The portable packaged water storage and treatment system 700 may be used to collect, store, treat and pump potable water when public water systems are not available. The system 700 may be utilized by public and private entities, such as remote or temporary military installations, scientific research stations, or emergency and disaster relief efforts. Permanent water treatment solutions can be developed and implemented as part of infrastructure rebuilding and expansion plans.

The system 700 provides the ability to collect, store and treat water, particularly in arid regions of the world, including developing nations with poor populations lacking access to clean water supplies. As in the previous embodiments, the system 700 includes a tank or housing 702, preferably formed from steel-reinforced polyethylene (SRPE) piping having a steel exterior spiral-ribbed banding that is encapsulated with a high-density polyethylene plastic, such as that sold under the name DuroMaxx™, as shown in FIGS. 15 and 16 and described further above.

The SRPE tank provides long term storage capabilities for bulk water and utilizes inert plastic materials. The housing 702 is contained within an outer container 704, such as a standard cargo shipping container. The container 704 provides protection of the SRPE housing 702 from weather and vandalism, while providing a relatively simple and standardized unit for transportation. The utilization of a standard cargo shipping container as the outer container 704 permits easy transportation by truck, train, or ship anywhere in the world. It should be noted that the above configuration provides two independent structurally sound vessels for protection of material stored therein.

The steel cargo shipping container 704 may have exemplary dimensions of approximately eight feet in width, eight and one-half feet in height, and forty feet in length. The SRPE water storage tank 702 is preferably installed from above into the open top cargo container 704 or, alternatively, through the double doors of a standard cargo container. The SRPE housing 702 is preferably cylindrical, as in the previous embodiments, and may have exemplary dimensions of approximately seven feet in diameter and thirty-five feet in length, thus allowing for approximately 9,000 gallons of storage.

As in the previous embodiments, the bulkheads of the housing 702 can be either steel-reinforced plastic, compression-molded plastic, or injection/rotationally molded hemispherical plastic. As in the previous embodiment, the housing 702 preferably includes an access riser 718 and a hatch 720 installed in the top of the housing 702. Using the exemplary dimensions given above, the remaining five feet or more of cargo container space within the outer shipping container 704 is unfitted into an equipment room 722 for water treatment and pump equipment, such as a hydro-pneumatic pressure tank 714, at least one booster pump 716, controls 724, chemical feed systems, a filter system 706, such as a sand filter or the like, soda ash 708, a chlorine supply 712, a potassium permanganate supply 710, and any other ancillary components, as required.

The booster pumps 716 provide pressurization and meet water demand for the water distribution system. The booster pumps 716 provide sufficient flow capacity to meet normal and peak demand. The hydro-pneumatic pressure tank 714 is preferably equipped with an air compressor that automatically recharges pressurized air to the housing 702. Preferably, the equipment room 722 is accessed by a standard double door access assembly 726, such as those typically associated with cargo containers.

It should be noted that the housing 702 is preferably separated from the equipment room 722 by a separation wall 740, which is preferably made of HDPE flat sheet. The separation wall 740 may be secured in place with countersunk stainless steel screws set into the HDPE bulkhead stiffeners. The perimeter of the .HDPE flat sheet may be secured in place with steel angle sections tack welded to the cargo container housing.

The water treatment, if any, will be ultimately determined based upon the water quality testing performed at each location. All treatment chemicals necessary will be metered into the system in liquid form. The water supply for the system 700 will be provided by a local water source, such as well, lake, or stream. As best shown in FIG. 22, water to be stored and/or treated is supplied through an inlet 744, which may be connected to an external pump. Potable water for distribution is supplied through an outlet 742.

As in the previous embodiments, the space between housing 702 and the outer container 704 is preferably filled with closed-cell urethane foam insulation 730. The insulation 730 provides haunch support for the SRPE housing 702 and provides an R-value rating averaging between "70" and "90". This insulation factor is significant and permits the utilization of the water treatment system 700 in harsh environments, such as arctic and desert regions. The treatment system 700 can be powered by a local electric utility or portable generator. Solar power can also be utilized to power the pumping and treatment equipment in remote areas where electricity is not available. This may be accomplished by installing photovoltaic cells on the top of the cargo container 704 and charging a series of direct current battery banks located in the equipment room 722. It should be understood that additional components, such as a light or an alarm 750 may be installed within equipment room 722, as desired.

Figure 21:
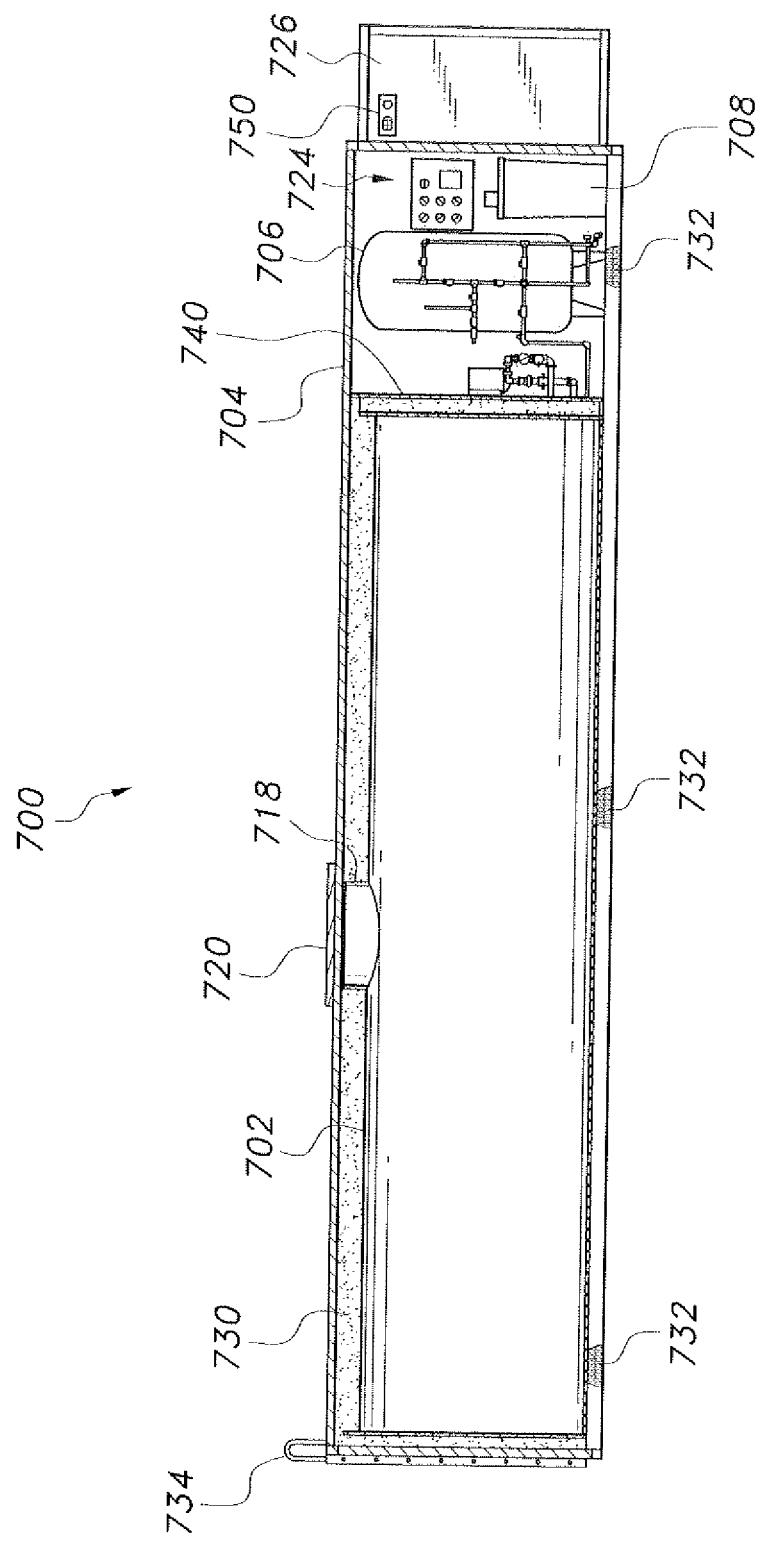
FIG. 21 is a side view in section of the water treatment and storage system of FIG. 20, shown from the opposite side and with the equipment room door being open.

Additionally, as in the embodiment of FIG. 12, the floor of the housing 702 may be separated from the floor of the outer container 702 by layers of insulation 732 or the like. As shown in FIGS. 21 and 22, an access ladder 734 may be mounted on the end of outer container 704 opposite equipment room 722.

FIGS. 31-34 illustrate a further alternative embodiment. In the system 800 of this further embodiment, the water filtration section 878 includes a raw water inlet 3298 that dumps the raw water into the storage tank 804 of the filtration section 878 for further processing. The water filtration section 878 and/or the storage tank 804 (comparable to water filtration section 678 and tank 600 of the embodiment of FIGS. 27 and 28) are extended to include an equipment room 808. The equipment room 808 is formed by extending the steel reinforced plastic tank 802 and separating the filtration section 878 and/or the raw water storage tank 804 from a dry chamber with a solid HDPE baffle wall 806. The external end of the dry chamber 808 terminates with an accessible bulkhead 810. The bulkhead 810 may be secured to the tank end by any suitable method, such as welding. The bulkhead 810 is preferably formed from HDPE or metal plating and has a hinged and lockable access door 812, preferably formed from a similar material.

As in the previous embodiments, the equipment room 808 is preferably uplifted to house water treatment and pump equipment, such as that described above in reference to cargo container equipment room 722. A level floor 814 is provided in the equipment room 808 to support a 120-gallon high pressure tank 816, duplex booster pumps 818 and other equipment that cannot be supported by the tank walls. A distribution pipe 3102 is connected to the high pressure tank 816 and extends outside of the equipment room 808. Brackets extend from the floor 814 to support a 50-gallon soda ash tank 3112 and a 50-gallon Sodium Hypochlorite tank 3114. Chemical feed pumps 3118 are disposed on top of the tanks 3112 and 3114. Lighting 834 is preferably mounted to a ceiling of room 808, as shown.

Figure 31:
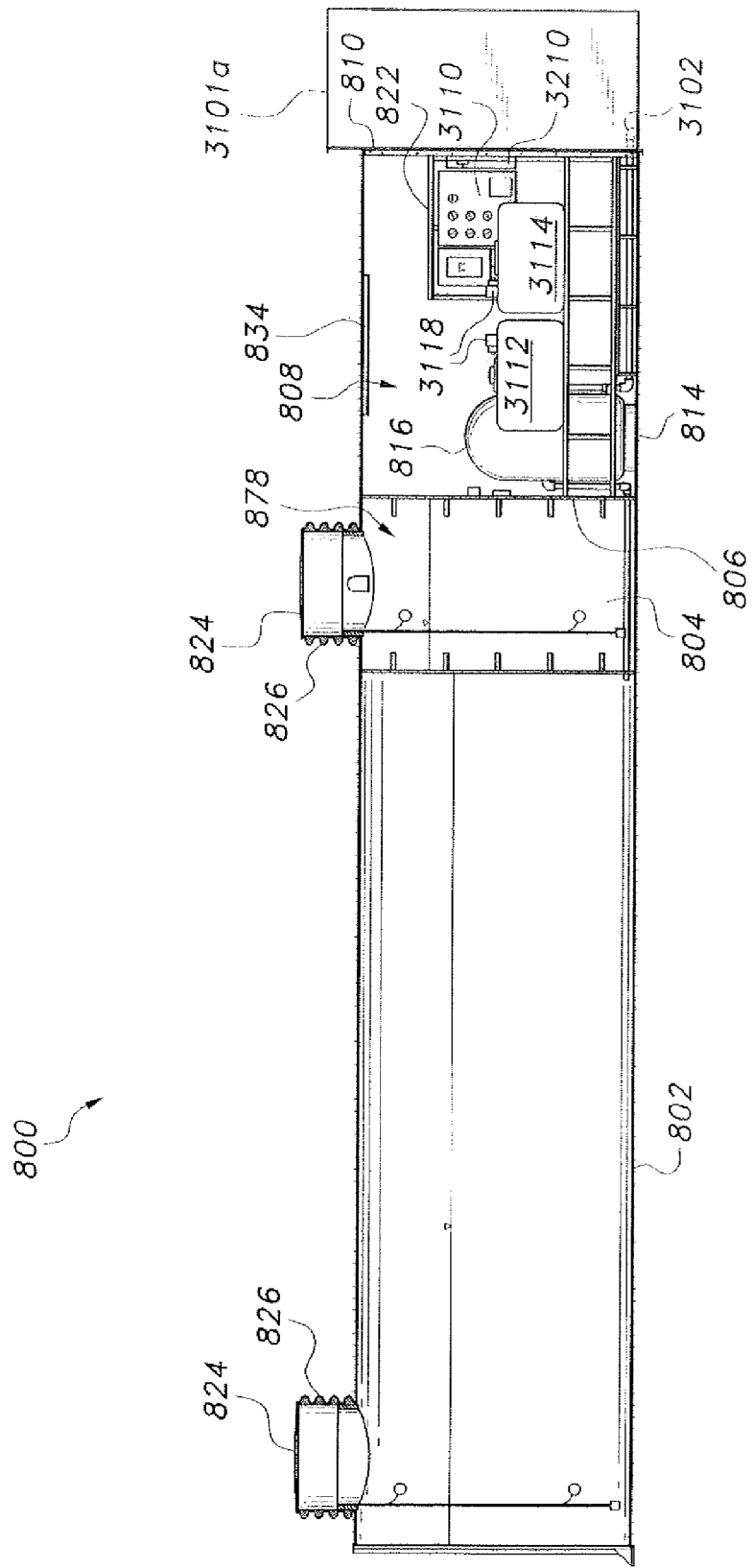
FIG. 31 is a side view, partially in section, of an alternative embodiment of a water treatment system according to the present invention.
Figure 32:
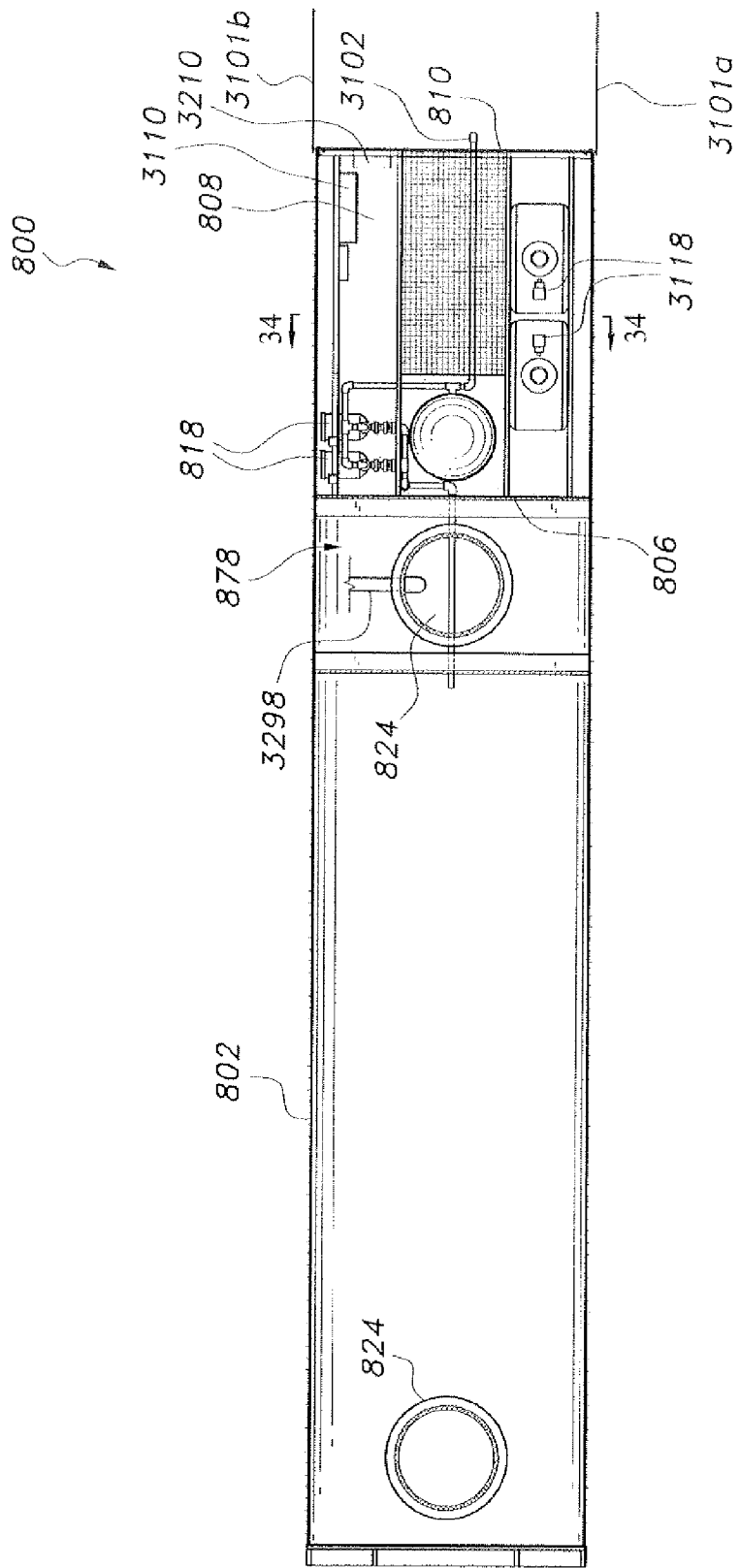
FIG. 32 is a top view in section of the water treatment system of FIG. 31, shown with the equipment door in the open state.
Figure 34:
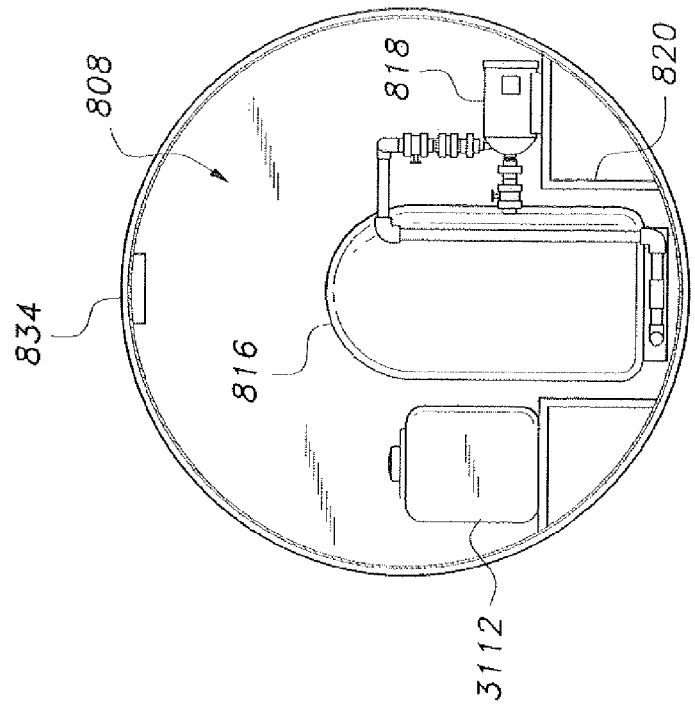
FIG. 34 is a section view along lines 34-34 of FIG. 31.
Figure 33:
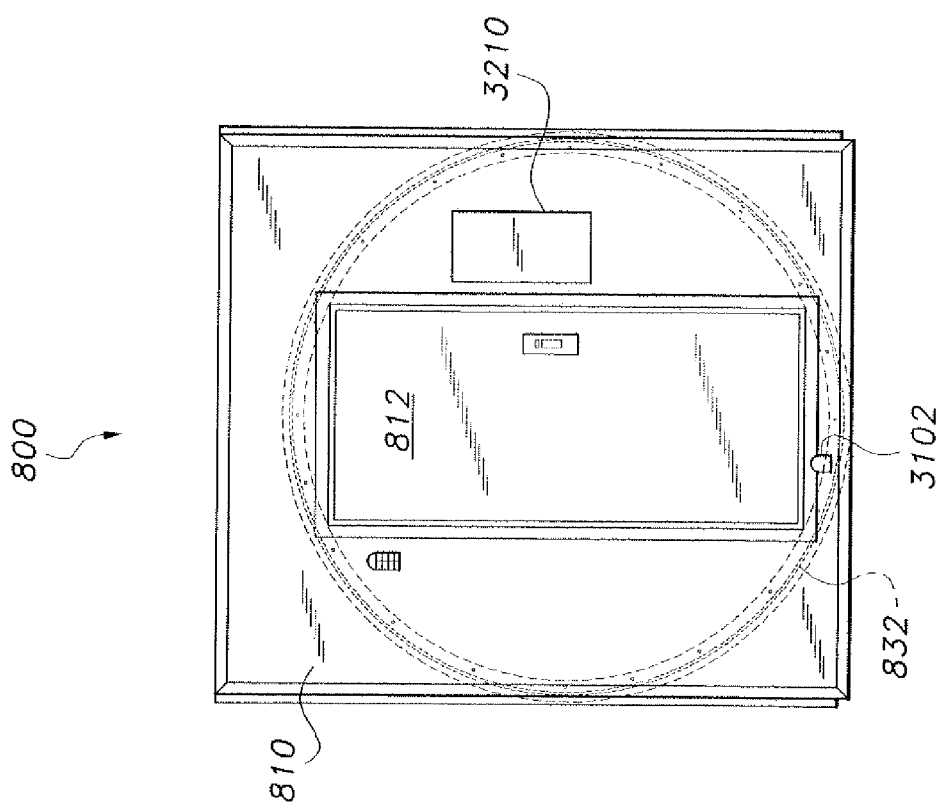
FIG. 33 is an end view of the water treatment system of FIG. 31, as seen from the right side of FIG. 31.

The floor 814 is preferably formed from HDPE, fiberglass, galvanized steel or any other suitable material. Equipment that can be supported from the tank walls is preferably mounted with rack systems 820 supported by HDPE, fiberglass, galvanized steel, or any suitable material fastened to HDPE supports, which may be fuse welded to the tank walls. Exemplary galvanized brackets are denoted generally as 822 in FIG. 31. As shown in FIG. 31, the brackets 822 form an enclosure for a control panel 3110. Ventilation is preferably provided to the equipment room 808 via through-the-wall HVAC unit 3210. A left half hinged wingwall assembly 3101a is shown in FIG. 31. The right half hinged wingwall assembly 3101b and the left half hinged wingwall assembly 3101a are shown in an open position in FIG. 32. When closed, the wingwall assemblies 3101a and 3101b provide additional isolation of the bulkhead. 810. Weld lines for joining the bulkhead 810 to the end of tank 802 are shown generally as 832 in FIG. 33. As in the previous embodiments, access to the tank 802 is preferably achieved through access hatches 824 mounted in raised or extendible risers 826.

The system 800 is preferably installed in a mounded condition; i.e., where the entire system is set level on grade and backfilled with locally provided materials. The mounded condition permits protection of the vessel from vandalism, theft, and natural disasters, while also permitting direct access to the equipment room 808 through door 812 mounted in the bulkhead 812. The mounded installation further allows for installation of the system under conditions where no heavy excavating equipment is available, but manpower is available.

The system 800 further avoids problems with flotation and dewatering in areas with high water tables or which are prone to flooding, while still providing the attributes of ground insulation and protection. The packaged system 800 additionally eliminates the need for an external building to house the treatment/pumping equipment and can, therefore, be installed and operational within a few days, thus greatly decreasing the time necessary to provide potable water to those in need. The system 800 further provides an opportunity for the military to provide underground water treatment facilities that are not easily detectable.

Figure 35:
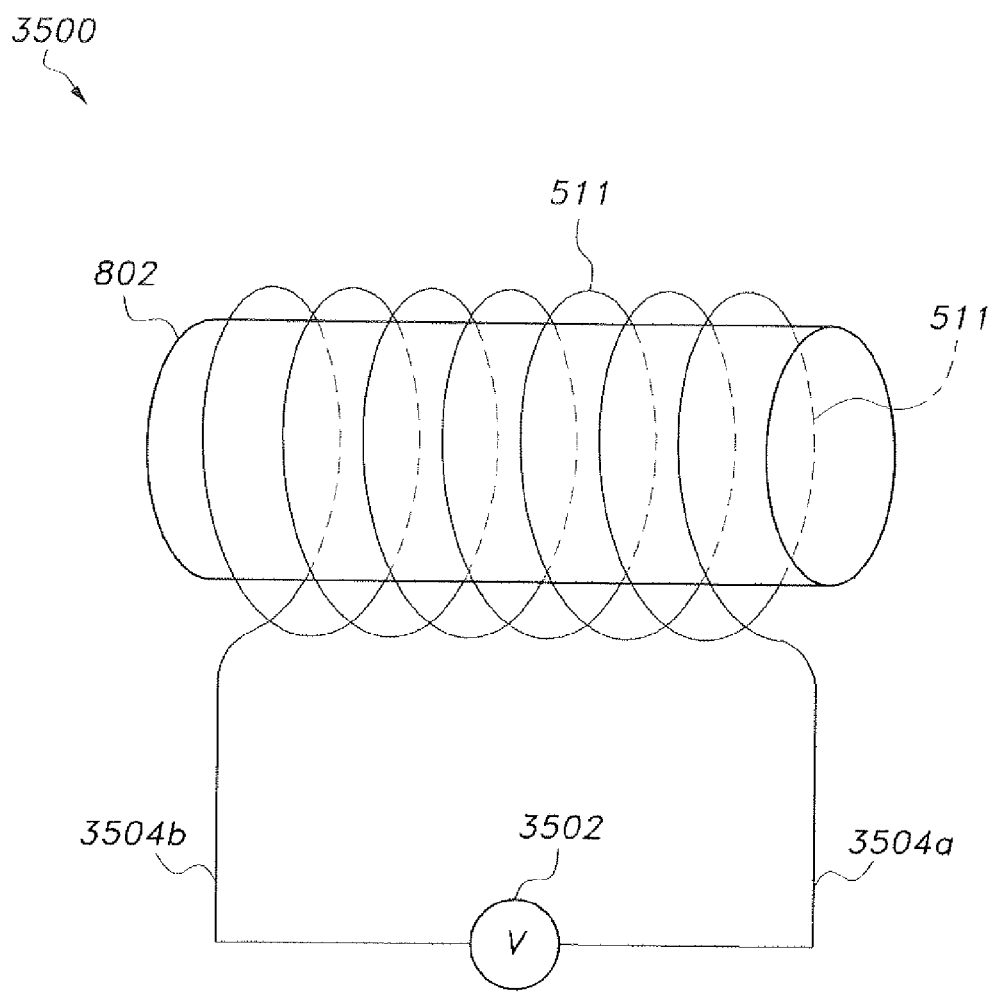
FIG. 35 is a schematic diagram of a circuit for generating an electromagnetic field around the tank of the wastewater treatment system of FIG. 16.

Additionally, the housing 802 may be further modified to include an electrical connection, whereby an electrical cable or circuit can be connected to the steel reinforcement ribs 511 embedded within plastic 513 such that an electrical potential is generated across the ends of the coiled steel ribs 511 to generate an electromagnetic field that would penetrate and extend into the inner vessel. FIG. 35 shows an exemplary electrical connection of the steel ribs 511 with an electrical potential source 3502 via cables 3504a and 3504b, forming a circuit supplying an electromagnetic field around the tank housing 802.

The resulting electromagnetic field may be manipulated by varying current, voltage, and frequency through the steel ribs 511. The resulting electromagnetic field can be utilized to enhance water treatment by changing the physical properties of wastewater constituents such that particulates can be easily removed, i.e., acting as an electromagnetic precipitator. The electromagnetic field can also be utilized to enhance wastewater and water disinfection by sterilizing or neutralizing waterborne pathogens.

Similarly, the system may be wrapped with a metal wire, preferably as individual insulated strands, to create additional coils around the outer steel reinforced plastic shell. This configuration is shown in FIG. 16, which illustrates how auxiliary electrical cabling 1511 can be disposed between the reinforcement ribs 511. It should be apparent to an artisan having ordinary skill that opposing ends of electrical cabling 1511 can be connected to the exemplary voltage source 3502 in order to provide additional electromagnetic field strength around the storage tank. This outer coil 1511 may be used to generate similar electromagnetic effects, and may also be used for additional water treatment options, such as reducing hardness in the water and/or precipitating minerals from the waste stream, i.e., an electromagnetic precipitator.

It is to be understood that the present invention is not limited to the embodiments described above, but encompasses any and all embodiments within the scope of the following claims.

We claim:
1. A wastewater treatment system, comprising:
a hollow, elongate, horizontally disposed, cylindrical body made from plastic, the cylindrical body having reinforcement ribs formed by a helically wound steel band embedded in the plastic and extending between opposite open ends of the elongate cylindrical body;
a tank bulkhead member extending across and covering one of the ends of the cylindrical body, and an equipment room bulkhead member across and covering the opposite end of the cylindrical body;
a fluid-tight wall mounted in the hollow, elongate cylindrical body, the tank bulkhead member, the fluid-tight wall. and the cylindrical body forming a fluid-tight tank defining at least one chamber adapted for storing liquid therein, and the equipment room bulkhead member, the cylindrical body, and the fluid-tight wall defining a dry chamber adapted for housing liquid treatment equipment;
an access hatch formed through the cylindrical body;
an inlet pipe extending into the tank adapted for admitting the liquid into the tank; and
an outlet pipe extending from the tank adapted for discharging the liquid from the tank.

2. The wastewater treatment system as recited in claim 1, further comprising an access door mounted in the equipment room bulkhead member.

3. The wastewater treatment system as recited in claim 1, further comprising means for filtering liquid stored in the tank.

4. The wastewater treatment system as recited in claim 1, wherein said cylindrical body is made from high-density polyethylene.

5. The wastewater treatment system as recited in claim 1, further comprising:
an access door mounted in said equipment room bulkhead member;
a left side wingwall pivotally attached to said equipment room bulkhead member; and
a right side wingwall pivotally attached to said equipment room bulkhead member;
wherein when the right side and left side hinged wingwalls are pivoted to a closed position, the wingwalls securely cover an entire outer portion of said equipment room bulkhead member.

6. The wastewater treatment system as recited in claim 2, further comprising: means for mounting treatment equipment inside said dry chamber, the treatment equipment including
a control panel disposed inside said dry chamber, the control panel being attached to said dry chamber via the means for mounting the treatment equipment;
a high pressure tank disposed inside said dry chamber, the high pressure tank being attached to said dry chamber via the means for mounting said treatment equipment;
duplex booster pumps operably connected to the high pressure tank and disposed inside said dry chamber, the duplex booster pumps being attached to said dry chamber via the means for mounting the treatment equipment;
chemical feed pumps disposed inside said dry chamber, the chemical feed pumps being attached to said dry chamber via the means for mounting the treatment equipment; and
chemical tanks operably connected to the chemical feed pumps and disposed inside said dry chamber, the chemical tanks being attached to said dry chamber via the means for mounting the treatment equipment.

7. The wastewater treatment system as recited in claim 6, further comprising:
lighting disposed inside said dry chamber; and
a climate control system disposed inside said dry chamber.

8. The wastewater treatment system as recited in claim 1, further comprising means for selectively electrically energizing the steel band to generate an electromagnetic field within said hollow, elongate cylindrical body, thereby forming an electromagnetic precipitator.

9. The wastewater treatment system as recited in claim 1, further comprising;
an insulated, electrically conducting coil wrapped around said cylindrical body between said reinforcement ribs; and
a voltage source selectively energizing said insulated, electrically conducting coil, thereby forming an electromagnetic precipitator.

10. The wastewater treatment system as recited in claim 9, wherein said coil is comprised of individual strands of electrical conducting material.

11. The wastewater treatment system as recited in claim 1, further comprising at least one stiffener mounted to an exterior surface of at least one of said bulkhead members.

12. The wastewater treatment system as recited in claim 11, wherein said at least one stiffener is formed from a high density polyethylene plate.

13. The wastewater treatment system as recited in claim 11, wherein said at least one stiffener comprises at least one steel-reinforced polyethylene strip.

14. The wastewater treatment system as recited in claim 11, further comprising at least one stiffener mounted to an interior surface of said at least one of said bulkhead members.

15. The wastewater treatment system as recited in claim 14, wherein said at least one interior mounted stiffener is formed from a high density polyethylene plate.

16. The wastewater treatment system as recited in claim 15, wherein said at least one interior mounted stiffener comprises at least one steel-reinforced polyethylene strip.

17. The wastewater treatment system as recited in claim 1, further comprising at least one gusset plate mounted to at least one of said bulkhead members 18. A wastewater treatment system, comprising:
a hollow, elongate, horizontally disposed, cylindrical body made from plastic, the cylindrical body having reinforcement ribs formed by a helically wound steel band embedded in the plastic and extending between opposite open ends of the elongate cylindrical body;
a tank bulkhead member extending across and covering one of the ends of the cylindrical body, and an equipment room bulkhead member across and covering the opposite end of the cylindrical body;
at least one gusset plate mounted to at least one of the bulkhead members;
a fluid-tight wall mounted in the hollow, elongate cylindrical body, the tank bulkhead member, the fluid-tight wall, and the cylindrical body forming a fluid-tight tank defining at least one chamber adapted for storing liquid therein, and the equipment room bulkhead member, the cylindrical body, and the fluid-tight wall defining a dry chamber adapted for housing liquid treatment equipment;
an access hatch formed through said cylindrical body;
an inlet pipe extending into the tank adapted for admitting the liquid into the tank; and
an outlet pipe extending from the tank adapted for discharging the liquid from the tank.

19. The wastewater treatment system as recited in claim 18, further comprising means for selectively electrically energizing the steel band to generate an electromagnetic field within said hollow, elongate cylindrical body, thereby forming an electromagnetic precipitator.

20. The wastewater treatment system as recited in claim 19, further comprising;

an insulated, electrically conducting coil wrapped around said cylindrical body between said reinforcement ribs of said helically wound steel band; and a voltage source selectively energizing said insulated, electrically conducting coil, thereby forming an electromagnetic precipitator.

\* \* \* \* \*